(12) United States Patent
Park

(10) Patent No.: US 11,212,674 B2
(45) Date of Patent: Dec. 28, 2021

(54) CONTROL METHOD OF SECURE MODULE CONNECTED TO A PLURALITY OF PROCESSORS AND ELECTRONIC DEVICE FOR IMPLEMENTING THE SAME

(71) Applicant: Samsung Electronics Co., Ltd., Suwon-si (KR)

(72) Inventor: Jungsik Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 260 days.

(21) Appl. No.: 16/414,556

(22) Filed: May 16, 2019

(65) Prior Publication Data

US 2019/0357044 A1 Nov. 21, 2019

(30) Foreign Application Priority Data

May 17, 2018 (KR) .......................... 10-2018-0056435

(51) Int. Cl.
*H04W 12/06* (2021.01)
*H04W 12/08* (2021.01)
(Continued)

(52) U.S. Cl.
CPC ........ *H04W 12/06* (2013.01); *G06F 13/4282* (2013.01); *H04B 5/0031* (2013.01); *H04W 12/43* (2021.01); *H04W 12/47* (2021.01)

(58) Field of Classification Search
None
See application file for complete search history.

(56) References Cited

U.S. PATENT DOCUMENTS 7,627,122 B1 * 12/2009 Horn ..................... H04W 12/06
370/331
7,984,301 B2 7/2011 Kaabouch et al.
(Continued)

FOREIGN PATENT DOCUMENTS

KR 10-2010-0136285 A 12/2010
KR 20160003992 A 1/2016
(Continued)

OTHER PUBLICATIONS

Implementation of Telebiometrics Application System Using Mobile Device. Shin. IJFIS. (Year: 2014).*
(Continued)

*Primary Examiner* — Venkat Perungavoor

(57) ABSTRACT

An electronic device is provided. The electronic device includes a first processor configured to perform communication with an external electronic device, a second processor configured to execute at least one application, and a secure module configured to include a first interface electrically connected with the first processor, a second interface electrically connected with the second processor, a memory storing subscriber information and biometric information, and a control circuit. The control circuit is configured to provide the subscriber information to the first processor through the first interface, based at least on a request received in connection with the communication from the first processor and provide the biometric information to the second processor through the second interface, based at least on a request received in connection with at least a portion of the at least one application from the second processor.

20 Claims, 15 Drawing Sheets

(51) Int. Cl.
*G06F 21/78* (2013.01)
*G06F 13/42* (2006.01)
*H04B 5/00* (2006.01)
*H04W 12/43* (2021.01)
*H04W 12/47* (2021.01)
*G06F 21/71* (2013.01)

(56) References Cited

U.S. PATENT DOCUMENTS

| | | | |
|---|---|---|---|
| 8,677,467 B2 | 3/2014 | Lincoln et al. | |
| 8,789,161 B2 | 7/2014 | Jeal et al. | |
| 8,831,680 B2 | 9/2014 | Fa et al. | |
| 2004/0059915 A1* | 3/2004 | Laniepce | G07C 9/257 713/169 |
| 2007/0226805 A1 | 9/2007 | Jeal et al. | |
| 2008/0072051 A1* | 3/2008 | Kaabouch | G06F 21/556 713/176 |
| 2008/0257956 A1* | 10/2008 | Grannan | G06Q 30/06 235/380 |
| 2009/0064296 A1* | 3/2009 | Aikawa | G06F 21/35 726/6 |
| 2009/0191846 A1* | 7/2009 | Shi | G06Q 20/409 455/411 |
| 2009/0197640 A1 | 8/2009 | Fa et al. | |
| 2015/0347734 A1* | 12/2015 | Beigi | G06F 21/32 713/155 |
| 2015/0358790 A1* | 12/2015 | Nasserbakht | G06F 16/128 455/414.1 |
| 2016/0006728 A1 | 1/2016 | Park et al. | |
| 2016/0373149 A1* | 12/2016 | Elin | H04W 12/06 |
| 2017/0091768 A1 | 3/2017 | Yoon | |
| 2018/0114007 A1 | 4/2018 | Kim et al. | |
| 2018/0300526 A1* | 10/2018 | Cho | G06K 9/00919 |
| 2019/0095655 A1* | 3/2019 | Krawczewicz | H04W 12/06 |

FOREIGN PATENT DOCUMENTS

| | | |
|---|---|---|
| WO | 2014/043040 A1 | 3/2014 |
| WO | 2015093962 A1 | 6/2015 |

OTHER PUBLICATIONS

Trusted self-enrolment for attribute-based credentials on mobile phones. Hampiholi. (Year: 2015).*
ISA/KR, International Search Report and Written Opinion of the International Searching Authority, International Application No. PCT/KR2018/005818, dated Sep. 3, 2019, 10 pages.
Martijn Bolhuis, "Using an NFC-equipped mobile phone as a token in physical access control", Faculty of Electrical Engineering, Mathematics and Computer Science—University of Twente, XP055479280, Jul. 2, 2014, 130 pages.
European Patent Office, "Supplementary European Search Report", dated Mar. 3, 2021, in connection with European Patent Application No. 19804197.2, 9 pages.

* cited by examiner

CONTROL METHOD OF SECURE MODULE CONNECTED TO A PLURALITY OF PROCESSORS AND ELECTRONIC DEVICE FOR IMPLEMENTING THE SAME

CROSS-REFERENCE TO RELATED APPLICATION

This application is based on and claims priority under 35 U.S.C. § 119 to Korean Patent Application No. 10-2018-0056435, filed on May 17, 2018, in the Korean Intellectual Property Office, the disclosure of which is incorporated by reference herein its entirety.

BACKGROUND

1. Field

The present disclosure relates to secure technologies of an electronic device.

2. Description of Related Art

An electronic device may include components for storing a plurality of information, such as user authentication information or user subscription information, which need security when performing communication. For example, the electronic device may include a subscriber identification module capable of providing subscriber identification information and a secure storage space (e.g., a secure element (SE)) capable of storing other user authentication information.

The subscriber identification module may be a component which loads subscriber information and conforms to the standardized communication protocol, for example, a subscriber identity module (SIM), a universal SIM (USIM), universal integrated circuit card (UICC), an embedded UICC (eUICC), or an embedded SIM (eSIM).

Other user authentication information, for purposes other than communication may be stored in an SE. The SE may be a component which performs an operation complying with a non-communication protocol.

The above information is presented as background information only to assist with an understanding of the present disclosure. No determination has been made, and no assertion is made, as to whether any of the above might be applicable as prior art with regard to the present disclosure.

SUMMARY

Due to a variety of functions of an electronic device, a space available for arranging and rearranging components within the electronic device has tended to decrease. Due to this, there has been an increase in implementing several functions in a single physical component, such as a chip. For example, instead of a SIM capable of only maintaining subscriber identification information, an integrated chip, for example, a USIM, is used to perform another function other than the function. However, a device for providing communication security information and a device for providing non-communication security information are still implemented on physically independent components.

Aspects of the present disclosure are to address at least the above-mentioned problems and/or disadvantages and to provide at least the advantages described below. Accordingly, an aspect of the present disclosure is to provide a secure module for storing and managing communication security information and non-communication security information in an integrated manner, an electronic device including the secure module, and a method performed in the electronic device.

In accordance with certain embodiments of the present disclosure, an electronic device is provided. The electronic device may include a first processor configured to perform communication with an external electronic device, a second processor configured to execute at least one application, and a secure module configured to include a first interface electrically connected with the first processor, a second interface electrically connected with the second processor, a memory storing subscriber information and biometric information, and a control circuit. The control circuit may be configured to provide the subscriber information to the first processor through the first interface, based at least on a request received in connection with the communication from the first processor and provide the biometric information to the second processor through the second interface, based at least on a request received in connection with at least a portion of the at least one application from the second processor.

In accordance with various embodiments of the present disclosure, an electronic device is provided. The electronic device may include a first interface electrically connected with a first processor, a second interface electrically connected with a second processor, a memory storing subscriber information and biometric information, and a control circuit. The control circuit may be configured to provide the subscriber information to the first processor through the first interface, based at least on a request of the first processor and provide the biometric information to the second processor through the second interface, based at least on a request of the second processor.

In accordance with some embodiments of the present disclosure, an electronic device is provided. The electronic device may include a secure module configured to include a first interface, a second interface, and a memory storing subscriber information and biometric information, a first processor configured to be electrically connected with the secure module through the first interface and perform communication with an external electronic device, and a second processor configured to be electrically connected with the secure module through the second interface and execute at least one application. The first processor may be configured to obtain a request associated with initialization of the secure module and refrain from performing the initialization while the first processor uses the secure module, in response to the request, and perform the initialization while the first processor does not use the secure module.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure.

Figure 1A:
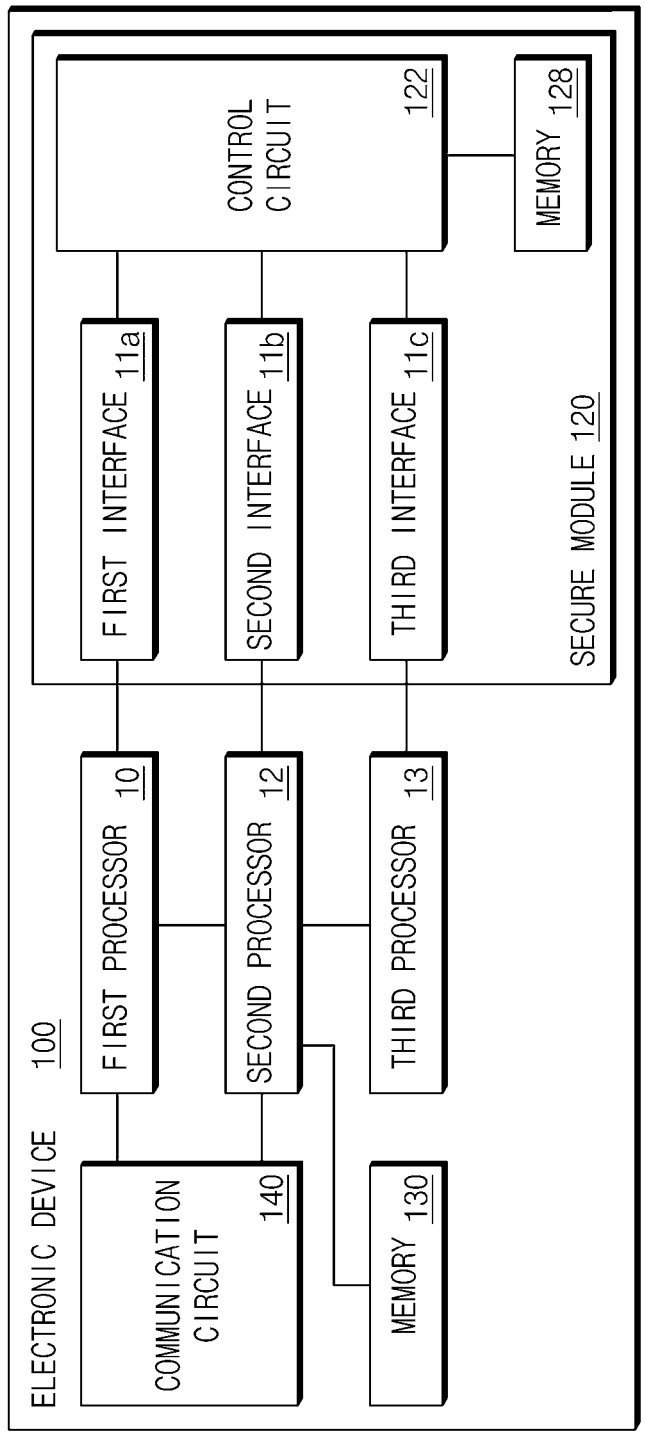
FIGS. 1A and 1B are block diagrams illustrating electronic devices according to various embodiments of this disclosure.

FIG. 1A is a block diagram illustrating a configuration of an electronic device according to various embodiments of this disclosure.

Referring to the non-limiting example of FIG. 1A, an electronic device 100 may include at least one of at least one processor, a secure module 120, a memory 130, or a communication circuit 140.

According to certain embodiments, the at least one processor may include at least one of a first processor 10, a second processor 12, and a third processor 13.

According to various embodiments, the first processor 10 may be a processor for communicating with an external device. For example, the first processor 10 may be a communication processor (CP).

According to some embodiments, the second processor 12 may be a processor for executing at least one application. The second processor 12 may be, for example, an application processor (AP).

According to certain embodiments, the third processor 13 may be configured to transmit and receive information associated with a financial payment service with the secure module 120. The third processor 13 may be included in a near field communication (NFC) module.

According to various embodiments, the secure module 120 may store security information which requires secure storage. The security information may include at least one of first security information including information for a communication service, second security information including information associated with an application, and third security information including at least one of information associated with a financial payment service and information associated with an embedded identification (ID) service.

According to some embodiments, the first security information may include subscriber information for a communication service. The first security information may further include profile information for a communication service. In addition, the first security information may include user authentication information or information associated with a roaming service.

The second security information may include information for a service associated with an application. For example, the second security information may include information, such as user authentication information, which requires security. For example, the user authentication information may be biometric information and may include information, such as iris information or fingerprint information of a user, for identifying the user. The second security information may include subscriber information and/or may fail to include profile information.

According to certain embodiments, the third information may include information associated with a financial service (e.g., a payment service). The third information may be provided to the second processor 12 via the third processor 13.

According to various embodiments, the secure module 120 may be configured as hardware. The secure module 120 may be implemented as one chip which supports two or more protocols in an integrated manner. For example, the secure module 120 may support a communication protocol and a non-communication protocol. The communication protocol may include, for example, a protocol conforming to the global systems for mobile communications association (GSMA) technical specification.

According to some embodiments, the secure module 120 may be implemented in a configuration in which two or more legacy chips associated with security are integrated. A chip for supporting the communication protocol may be, for example, a subscriber identity module (SIM), a universal SIM (USIM), or an embedded SIM (eSIM) (or an embedded universal integrated circuit card (eUICC)). A chip for supporting the non-communication protocol may be, for example, a secure element (SE) or an embedded SE (eSE). In various embodiments disclosed in the present disclosure, the secure module 120 is embodied as, but not limited to, the eSIM and eSE are integrated with each other. For example, the secure module 120 may have a structure where various chips are integrated with one another.

According to certain embodiments, the secure module 120 may include at least one of a control circuit 122, a first interface 11a, a second interface 11b, a third interface 11c, and a memory 128.

According to various embodiments, the control circuit 122 may perform one or more operations of secure module 120 according to various embodiments disclosed in the present disclosure or may control the components in the secure module 120 to perform such an operation.

According to some embodiments, the first interface 11a may be electrically connected with the first processor 10. The first interface 11a may include, for example, an international organization for standardization (ISO) interface (e.g., ISO7816-3 interface, ISO7816-4 interface, ISO14443-3 interface, or ISO14443-3 interface). When receiving a request to provide first security information from the first processor 10, in response to the request, the secure module 120 may provide the first security information to the first processor 10 via the first interface 11a.

According to certain embodiments, the second interface 11b may be electrically connected with the second processor 12. The second interface 11b may be a common memory interface. The second interface 11b may include at least one of, for example, a serial peripheral interface (SPI), a peripheral component interface express (PCIe), and a double data rate (DDR) interface. When receiving a request to provide second security information from the second processor 12, in response to the request, the secure module 120 may provide the second security information to the second processor 12 via the second interface 11b.

According to various embodiments, the third interface 11c may be electrically connected with the third processor 13. The third interface 11c may utilize a single wire protocol (SWP). According to some embodiments, the secure module 120 may transmit or receive third security information with the third processor 13 via the third interface 11c. The third processor 13 may obtain the third security information from the secure module 120 via the third interface 113c. When it is necessary to additionally perform a transmission and reception authentication procedure for the third security information, the third processor 13 may request the second processor 12 to authenticate transmission and reception.

According to certain embodiments, the memory 128 may store at least one of the first security information, the second security information, and the third security information. The first security information may include, for example, subscriber information. According to various embodiments, the second security information may include, for example, biometric information. The third security information may include information associated with a financial service.

According to some embodiments, the secure module 120 may at least include a first area associated with the first security information and a second area associated with the second security information and the third security information. For example, the memory 128 may include a first area which stores the first security information and a second area which stores the second security information. Alternatively, the memory 128 may include a first memory which stores the first security information and a second memory which stores the second security information.

According to certain embodiments, while the first area of the secure module 120 is activated, the first processor 10 may transmit and receive the first security information with the secure module 120. While the second area of the secure module 120 is activated, the second processor 12 may transmit and receive the second security information with the secure module 120.

According to various embodiments, while the first area is activated, the secure module 120 and the first processor 10 may perform an operation associated with the first area (or the first security information). While the second area is activated, the second processor 12, the third processor 13, and the secure module 120 may perform an operation associated with the second area (or the second security information).

According to some embodiments, the memory 130 located outside the secure module 120 may store information according to various embodiments disclosed in the present disclosure. The memory 130 may store instructions executed by at least one processor (for example, the processors numbered 111 to 113).

According to certain embodiments, the memory 128 may be configured to be physically integrated with the memory 130 and such that two areas are logically divided. The other components of the secure module 120 except for the memory 128 may be integrated into the second processor 12. A part of a data bus in the second processor 12 may be used as the second interface 11b. Data stored in the memory 128 may be encrypted with a key value of the secure module 120 for security and may then be provided to the memory 130 via the second interface 11b.

According to various embodiments, the communication circuit 140 may be electrically connected with the first processor 10 and/or the second processor 12. The communication circuit 140 may transmit a signal, obtained from the first processor 10, to an external device or may provide a signal, received from the external device, to the first processor 10. According to some embodiments, the communication circuit 140 may include a component, such as a radio frequency (RF) frontend, associated with communication connected to the first processor 10, and a component, such as a wireless-fidelity (Wi-Fi) module, associated with communication connected to the second processor 12.

Figure 1B:
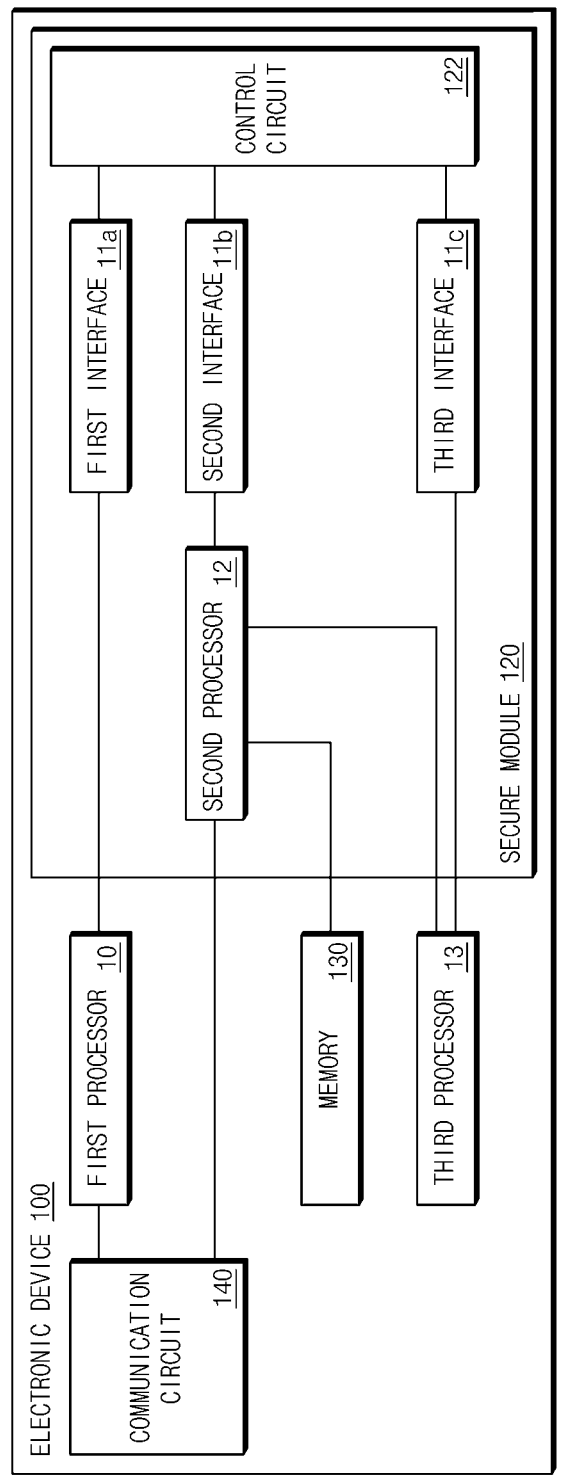

FIG. 1B illustrates, in block diagram format, a configuration of an electronic device according to certain embodiments of this disclosure.

Referring to the non-limiting example of FIG. 1B, a secure module (for example, secure module 120 of FIG. 1A) may be configured to be integrated as part of one or more components. For example, the secure module 120 may be integrated with second processor 12 of FIG. 1A. In certain embodiments, an electronic device 100 may include a first processor 10, a third processor 13, a secure module 120 (or a second processor 12), a memory 130, a communication circuit 140.

When the secure module 120 is integrated into the second processor 12, a memory 128 of FIG. 1A may be integrated with the memory 130. A description about the memory 130 of FIG. 1B may refer to the description about a memory 130 of FIG. 1A and the memory 128 of FIG. 1A. For example, first to third security information may be stored in the memory 130 of FIG. 1A.

According to certain embodiments, when the third processor 13 requests the secure module 120 (or the second processor 12) to provide data, in response to the request, the secure module 120 may obtain a response to the request from the memory 130 and may provide the response to the third processor 13.

Figure 2:
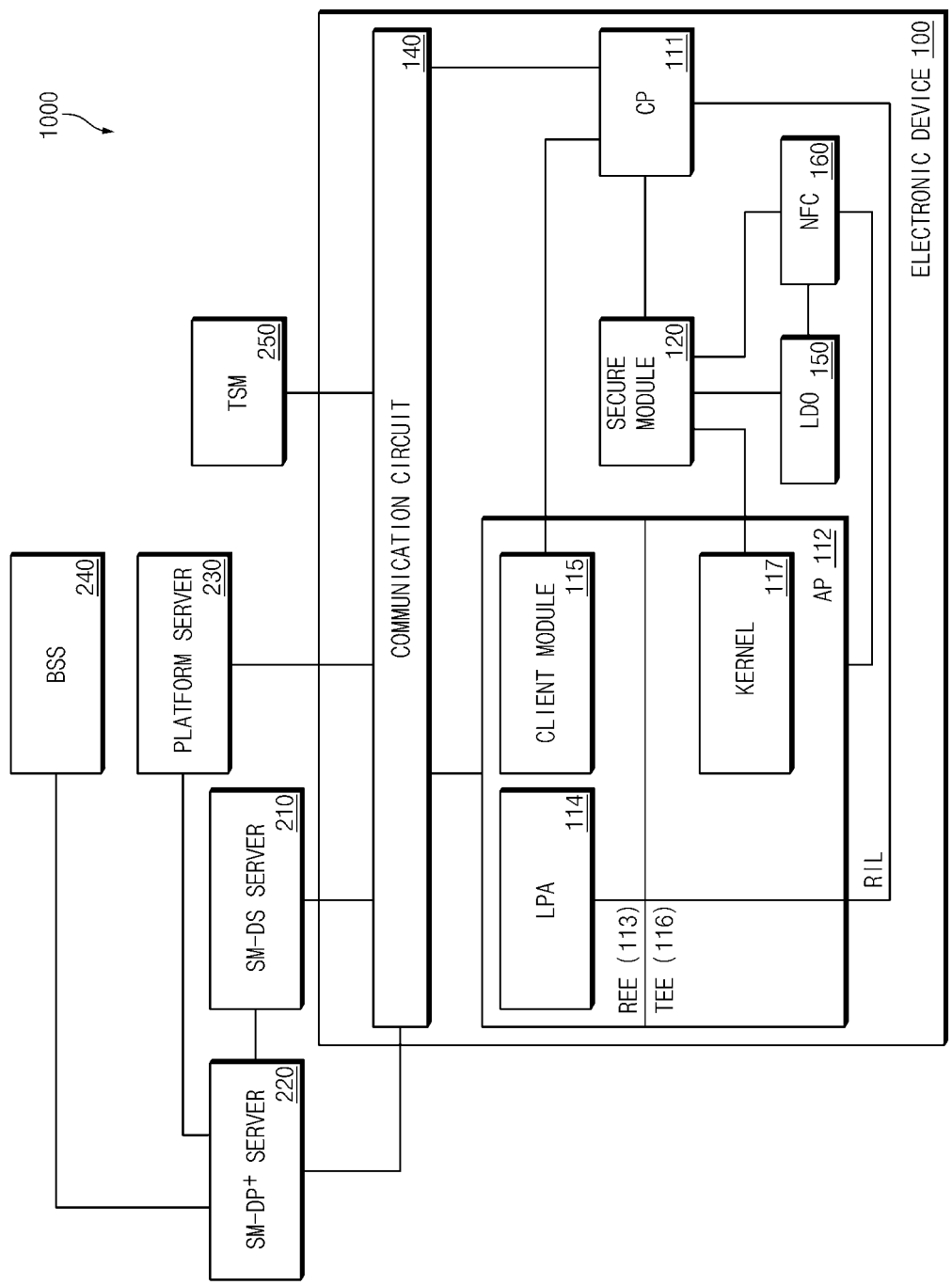
FIG. 2 illustrates a network environment of an electronic device according to some embodiments of this disclosure.

FIG. 2 illustrates a network environment of an electronic device according to some embodiments of this disclosure.

According to various embodiments, an electronic device 100 may operate in a network environment which supports two or more protocols supported by a secure module 120. According to some embodiments, a network 1000 may include at least one of a first network entity capable of providing a service associated with first security information, a second network entity capable of providing a service associated with second security information, and a third network entity capable of providing a service associated with third security information.

In the non-limiting example described below, the first network entity is embodied as, but not limited to, an entity conforming to the global systems for mobile communications association (GSMA) technical specification, and the second network entity and/or the third network entity is embodied as, but not limited to, an entity capable of providing a service associated with an eSE. For example, the network 1000 may include a network entity for supporting a communication protocol which is not disclosed in the present disclosure and network entities for supporting a non-communication protocol.

According to certain embodiments, the first network entity may include a subscription manager discovery server (SM-DS) 210, a subscription manager data preparation+ (SM-DP+) server 220, a platform server 230, or a business support system (BSS) 240. The network 1000 may further include a trusted service manager 250 for the service associated with the third security information.

According to various embodiments, the electronic device 100 may search for an event registered with the SM-DS 210 and may download a profile (or a profile package) from the SM-DP+ server 220. Each profile may correspond to a mobile network operator (MNO) (e.g., a network operator such as SKT, KT, or AT&T) or a communication service provided by the MNO.

According to some embodiments, the SM-DP+ server 220 may generate a profile package and may provide the profile package to a local profile assistant (LPA) 110 in a method with security.

A secure channel may be established between the SM-DP+ server 220 and the secure module 120 and may be used while a profile is downloaded and installed. A secure channel may be used in connection with transmitting a profile between the SM-DP+ server 220 and the electronic device 100.

The SM-DP+ server 220 may provide a profile package to the secure module 120. The profile package provided to the LPA 114 may be provided to the secure module 120 via a CP 111. The secure module 120 may store the profile package. The profile package may include information associated with downloading a profile.

For example, the SM-DP+ server 220 may perform an operation of verifying authority based on a certificate to manage a eUICC. In this case, an SM-DP+ certificate may indicate a business entity such as an MNO or a terminal manufacturer. The secure module 120 may verify a management operation of the secure module 120, performed by the SM-DP+ server 220.

According to certain embodiments, the SM-DP+ server 220 may include a certificate and a private key, which are issued from a sub-certification issuer (CI) of a CI. The SM-DP+ server 220 may generate a profile package and may perform an encryption operation. The secure module 120 may store a public key or a certificate and a private key. The secure module 120 may authenticate the LPA 114 having a certificate and a private key, which are issued from a corresponding CI and/or a sub-CI of the CI, using the certification and the key.

According to various embodiments, the SM-DS 210 may transmit an event capable of triggering profile installation to the LPA 114. An event identification (ID) or a server address may be included in the event. The LPA 114 may know the SM-DP+ server 220 capable of downloading a profile based on the event ID and the server address.

According to some embodiments, an MNO (or an operator) may refer to a network operator and may request the SM-DP+ server 220 to prepare for a profile. The profile requested by the MNO may be a profile which corresponds to each MNO or a communication service provided from the MNO. In addition, the description of the SM-DP+ server 220, the SM-DS 210, or the MNO may refer to the GSMA technical specification (e.g., the remote SIM provisioning (RSP) technical specification).

According to certain embodiments, the BSS 240 may be a system which provides a subscription authentication service, a network access service, or the like to support the MNO in providing a service to the user. The BSS 240 may register an advance payment plan of the electronic device 100 via the platform server 230. For example, the BSS 240 may know a profile type or the like through the platform server 230 and may transmit a profile command including the profile type to the SM-DP+ server 220. The profile type may be, for example, a profile type according to a tariff registered with a server. The profile type may be a SIM type, such as an internet protocol multimedia SIM (ISIM) or a universal SIM (USIM), conforming to an advance payment plane.

According to various embodiments, the platform server 230 may transmit a profile download command to the SM-DP+ server 220. The profile download command may include a profile type. The platform server 230 may communicate with a client module in the electronic device 100 and may display an advance payment plan registered by an MNO (e.g., a list of tariffs to which a user may subscribe, the list being provided by the MNO) on the electronic device 100.

According to some embodiments, a profile for a specific MNO may be stored in the secure module 120. The profile may be stored in a secure domain in the secure module 120. The secure domain may be, for example, a secure domain in a first area of the secure module 120.

According to various embodiments, the secure module 120 may include a first area which stores first security information and a second area which stores second security information or third security information. In addition, the first area may include information associated with the first security information. For example, the first area may store an application associated with the first security information. The second area may include information associated with the second security information. For example, the second area may store an application associated with the second security information.

The first area may include, for example, an eSIM domain. The second area may include an eSE domain. The eSIM domain may include an application associated with a SIM service and a secure domain (e.g., an eSIM secure domain) associated with the application. The eSE domain may include an application associated with an eSE service and a secure domain (e.g., an eSE secure domain) associated with the application.

According to certain embodiments, the electronic device 100 may at least include the LPA 114 and the client module 115 for an operation associated with the first security information.

According to various embodiments, the LPA 114 may search for an event kept in the SM-DS 210 and may communicate with the SM-DP+ server 220, thus downloading a profile package. The LPA 114 may support profile management of the secure module 120. The LPA 114 may provide a command or request for profile management to the secure module 120 and may process a response provided from the secure module 120. The profile management (or a profile management operation) may include at least one of, for example, downloading a profile, installing the profile, enabling the profile, disabling the profile, deleting the profile, or retrieving or modifying profile information such as a profile list.

According to some embodiments, the LPA 114 may be executed by a processor. For example, the LPA 114 may be a software module which is executed by an AP 112 or a CP 111 or is run in the secure module 120. The LPA 114 may be run on rich execution environments (REE) 113 of the AP 112.

According to certain embodiments, the client module 115 may facilitate communication between the electronic device 100 and the platform server 230. The client module 115 may be a software module implemented by the AP 112. The client module 115 may be implemented in the REE 113 of the AP 112.

According to various embodiments, the third network entity may include the TSM 250. According to some embodiments, the electronic device 100 may transmit the third security information to the TSM 250 or may receive the third security information from the TSM 250. The third security information may be information stored in the second area in the secure module 120. The second area may correspond to an eSE domain. An SE (or eSE) may be an integrated circuit (IC) in which a transportation card, a credit card, or an application, which, for example, supports a payment service, is installed.

According to certain embodiments, the TSM 250 may connect a financial service provider with a communication service provider. The TSM 250 may perform service management, multi-service management (e.g., a connection to another TSM), key management, or over the air (OTA) management. The TSM 250 may be invested with the right to use the second area of the secure module 120 from the communication service provider and may provide a coherent mobile payment service to a final consumer. The TSM 250 may issue a service for the second area, may stop the service, may upgrade the service, and may delete, reinstall, and initialize the service. The TSM 250 may generate a secure domain corresponding to the second area. The TSM 250 may generate or clear a key. The TSM 250 may manage an OTA channel. The OTA channel may include a bearer independent protocol (BIP), a short messaging service point to point (SMS-PP), or an OTA proxy. The BIP may correspond to a wireless channel between the second area of the secure module 120 and the TSM 250. The SMS-PP may correspond to an SMS message transport channel between the TSM 250 and the second area. The OTA proxy may relay the TSM 250 and the second area and may use a public protocol such as hypertext transfer protocol (HTTP).

According to various embodiments, the electronic device 100 may include at least one processor capable of transmitting and receiving the first secure information and the second secure information with the secure module 120. The at least one processor may include the AP 112 and the CP 111 or an NFC module 160. According to some embodiments, the NFC module 160 may be referred to as a third processor. According to certain embodiments, the NFC module 160 may include at least one of a central processing unit (CPU), a random access memory (RAM), an electrically erasable programmable read-only memory (EEPROM), a cache memory, and a crypto engine.

According to various embodiments, the AP 112 may include the LPA 114, the client module 115, or a kernel 117 and may include the REE 113 and a trusted execution environment (TEE) 116. The TEE 116 may be a secure area, and the kernel 117 may be implemented in the TEE 116. According to some embodiments, the REE 113 and the TEE 116 in the AP 112 may be areas which are physically divided. The TEE 116 may be a secure area having the same secure level as the secure module 120.

According to certain embodiments, the kernel 117 may function as a drive of the second area of the secure module 120. For example, the kernel 117 may include an eSE drive.

According to various embodiments, the CP 111 may provide the first security information, obtained through the LPA 114, to the secure module 120 or may provide the first security information, obtained from the secure module 120, to the LPA 114.

According to some embodiments, the CP 111 may transmit and receive the first security information with the first area of the secure module 120. The CP 111 may transmit and receive the first security information with the secure module 120 via a first interface. According to certain embodiments, the first interface may be an ISO interface.

According to various embodiments, the second area of the secure module 120 may transmit and receive the second security information with the AP 112 via the second interface. The second interface may be a serial peripheral interface (SPI) bus.

According to some embodiments, the second area of the secure module 120 may transmit and receive the third security information with the NFC module 160 via a third interface. The third interface may be, for example, a single wire protocol (SWP) interface.

According to certain embodiments, the electronic device 100 may include a power circuit and a short range communication module. In FIG. 2, the power circuit is exemplified as, but not limited to, a low dropout (LDO) 150, and the short range communication module is exemplified as, but not limited to, a near field communication (NFC) module 160. For example, the power circuit and the short range communication module may cover modifications according to various embodiments disclosed in the present disclosure. The LDO 150 may be, for example, a power management integrated circuit (PMIC), a battery, or the like. According to various embodiments, the LDO 150 and the NFC module 160 may be arranged with the secure module on one system on chip (SoC) or may be arranged on a chip independent of the secure module 120. The NFC module 160 may provide the second security information stored in the second area to the AP 112, or may obtain the second security information from the AP 112 and may provide the obtained second security information to the second area. The NFC module 160 may be connected with the AP 112 via an inter integrated circuit (I2C).

According to some embodiments, the electronic device 100 may transmit or receive a signal with an external server via a communication circuit 140. According to certain embodiments, the AP 112 and/or the CP 111 may transmit or receive a signal with the SM-DS 210, the SM-DP+ server 220, the platform server 230, and/or the TSM 250. The AP 112 may transmit or receive a signal with the external server via the CP 111 and the communication circuit 140 or may transmit or receive a signal with the external server directly via the communication circuit 140 without passing through the CP 111. For example, when using Wi-Fi communication, the AP 112 may communicate with the external server without passing through the CP 111. When using a network provided from an MNO, the AP 112 may communicate with the external server via the CP 111.

According to various embodiments, the LPA 114 or the client module 115 of the AP 112 may be connected with the CP 111 via a radio interface layer (RIL) connected to the AP 112. The LPA 114 or the client module 115 may be connected to the CP 111 via the RIL to transmit or receive data with the external server (e.g., the SM-DS 210, the SM-DP+ server 220, the platform server 230, or the TSM 250) via the communication circuit 140.

Figure 3A:
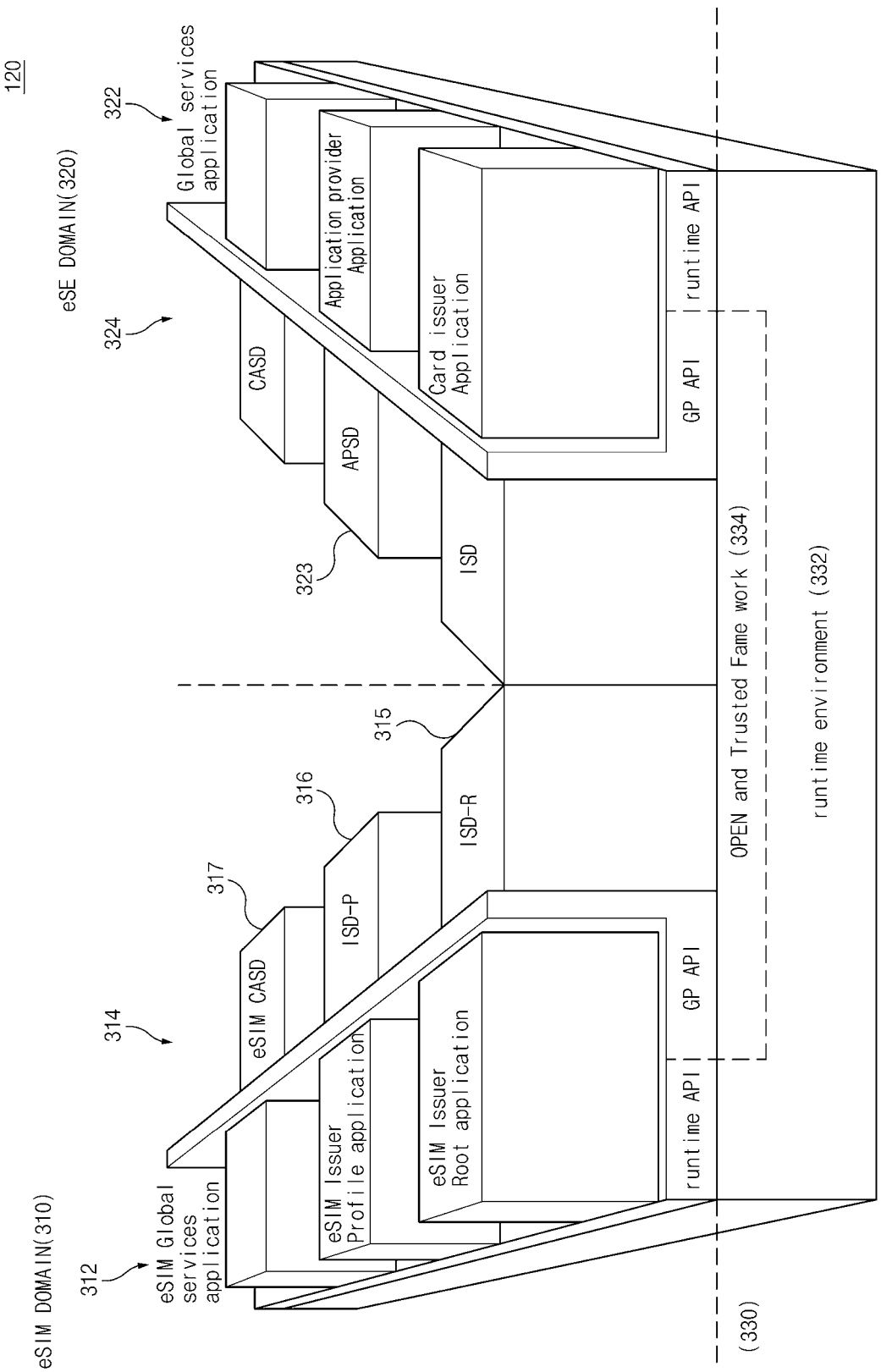
FIG. 3A illustrates a hierarchical structure of a secure module according to certain embodiments of this disclosure.

FIG. 3A illustrates a hierarchical structure of a secure module according to certain embodiments of this disclosure.

Referring to the non-limiting example of FIG. 3A, a secure module 120 (e.g., a secure module 120 of FIG. 1A) may be implemented as one chip which supports two or more protocols. For example, the protocol may be at least one of an ISO interface associated with the network, an SPI associated with biometric information, and an SWP associated with a financial service.

According to certain embodiments, the secure module 120 may include a first area 310 which stores first security information, a second area 320 which stores at least one of second security information and third security information, and a third area 330 for transmitting and receiving the first security information, the second security information, and the third security information with the first area 310, the area 320, and processors (e.g., an AP 112 and/or a CP 111 of FIG. 2) or an NFC module (e.g., an NFC module 160 of FIG. 2).

According to various embodiments, the first area 310 may be an area which stores the first security information. The first area 310 may be an area including components conforming to a communication protocol other than the first security information. The first area 310 may be referred to as an eSIM domain 310.

According to some embodiments, the second area 320 may be an area which stores the second security information. The second area 320 may be an area including components utilizing a non-communication protocol other than the second security information. The second area 320 may be referred to as an eSE domain 320.

According to certain embodiments, the third area 330 may be an area capable of processing both the first security information and the second security information. The secure module 120 may transmit and receive the first security information with a CP (e.g., the CP 111 of FIG. 2) via the third area 330, may transmit and receive the second security information with an AP (e.g., the AP 112 of FIG. 2), or may transmit and receive the third security information with an NFC module (e.g., an NFC module 160 of FIG. 2). A channel for transmitting and receiving the first security information may be established in the third area 330, and a channel for transmitting and receiving the second security information and/or the third security information may be established in the third area 330. According to various embodiments, any one or only any one of the first security information and the second security information may be provided to a processor on the third area during the same time interval.

According to some embodiments, the secure module 120 may support a hardware-based crypto co-processor (CCP) and may generate a public key, and may provide an application programming interface (API) capable of using the public key based on an application to an eSE platform or an eUICC platform (e.g., a Java card platform or the like). The eSE platform or an eSIM platform may be one of platforms, each of which loads a multi-application and provides a service. For security reasons, each of eSE and SIM services may issue data to a memory through authentication and security by means of a management key. According to certain embodiments, the management key may be an integrated key for eSIM and eSE services for convenience of management and issue or may be a separate key for each of the eSIM and eSE services for security. Each of the eSE and SIM services may comply with a global platform and/or the GSMA technical specification.

According to various embodiments, the secure module 120 may include secure domains 314 and 324. According to some embodiments, the eSIM domain 310 and the eSE domain 320 of the secure module 120 may include the secure domains 314 and 324, respectively.

According to certain embodiments, each of the secure domains 314 and 324 may load, install, or delete an application. Each of the secure domains 314 and 324 may have a key for security and may provide a security service using the key. For example, the security service may include key handling, encryption, decryption, or the like. The application may be, for example, a network access application (NAA) of an eSIM, a digital card application of an eSE, biometric information storage application, or the like. Hereinafter, the secure domain 314 of the eSIM domain 310 may be referred to as the eSIM secure domain 314, and the secure domain 324 of the eSE domain 320 may be referred to the eSE secure domain 324.

According to various embodiments, a plurality of applications 312 may be stored in the eSIM domain 310. The eSIM domain 310 may include, for example, at least one eSIM issuer root application for an eSIM issuer, one or more eSIM issuer profile applications for an eSIM profile issuer, and/or at least one global service application for providing a global service to another application. The eSIM issuer root application may be, for example, an LPA service application.

The eSIM secure domain 314 may, in some embodiments, be associated with each of the plurality of applications 312 of the eSIM domain 310. The eSIM secure domain 314 may include an issuer security domain root (ISD-R) 315 which generates and manages a new issuer security domain profile (ISD-P) 316, the ISD-P 316 which is assigned a constant space from an eSIM provider and stores a profile package set (e.g., a policy rule, an MNO-SD, an NAA, a file system, or the like), and/or an eSIM controlling authority security domain (eCASD) 317 which stores a secure key associated with the eSIM secure domain 314 or a server certificate and performs a verification function.

According to some embodiments, a plurality of applications 322 may be stored in the eSE domain 320. For example, at least one card issuer application for a card issuer, at least one application provider application for an eSE-based service application provider, at least one global service application for providing a global service to another application, or the like may be stored in the eSE domain 320. The global service may include, for example, a cardholder verification method (CVM) service.

There may be the eSE secure domain 324 associated with each of the plurality of applications 322 of the eSE domain 320. The eSE secure domain 324 associated with each of the plurality of applications 322 may be permanently loaded into the eSE domain 320. The eSE secure domain 324 may include an application provider security domain (APSD) 323 (or a supplementary security domain), a controlling authority security domain (CASD) for performing a verification function for all applets loaded, and/or the like.

According to certain embodiments, the applications 312 and 322 may be implemented in a runtime environment 332 which is included in the third area 330 and includes an application programming interface (API). A specific key and a secure management application referred to as a secure domain may be generated in the runtime environment 332, and it may be ensured that keys are perfectly separated between a card issuer and a plurality of other secure domain providers.

According to various embodiments, a global platform (GP) environment (open) and a trusted framework 334 may be included below the applications 312 and 322 and the secure domains 314 and 324 of the secure module 120. The runtime environment 332 may be formed below the trusted framework 334. The GP environment (open) and the trusted framework 334 may be included in the third area 330.

According to some embodiments, a GP API may be provided between the applications 312 and 322 and/or the secure domains 314 and 324 and the GP environment (open) and the trusted framework 334. A runtime API may be provided between the applications 312 and 322 and/or the secure domains 314 and 324 and the runtime environment 332.

According to certain embodiments, the runtime environment 332 may be a card OS (COS). The OS may be compliant with, for example, the ISO 7816-3, ISO 7816-4, ISO 14443-3, and/or ISO 14443-4 specification. The runtime environment 332 may provide a service through data communication with an off-card entity (e.g., a TSM of an eSE or an SM-DP+ server of an eSIM). The data communication with the off-card entity may be, for example, an application protocol data unit (APDU) command or an APDU response.

According to various embodiments, the GP environment (open) may play a role in dividing a command. The GP environment (open) may select an application and a secure domain. For example, the GP environment (open) may establish a logical channel to the eSIM domain 310 in response to a command obtained from an LPA via an ISO interface. The GP environment (open) may establish a logical channel to an eSE domain in response to a command obtained from an NFC module (e.g., an NFC module 160 of FIG. 2) or a TEE of an AP via a single wire protocol (SWP) and/or an SPI.

According to some embodiments, the GP environment (open) may play a role in security management. The GP environment (open) may lock and/or unlock a secure domain. When a specific ISD-P is enabled in the eSIM domain 310 and when a network service of a specific MNO is activated, the GP environment (open) may lock an APSD except for the APSD 323 associated with the specific MNO in the eSE domain 320. Alternatively, the APSD except for the APSD 323 associated with the specific MNO may be enabled or disabled.

According to certain embodiments, the trusted framework 334 may provide inter-application communication between applications. The trusted framework 334 may expand a card runtime environment or may exist as one portion, rather than an application or a secure domain.

According to various embodiments, there may be the plurality of eSIM domains 310 and the plurality eSE domains 320.

According to some embodiments, inter processor communication (IPC) connected with the plurality of eSIM domains 310 may include different physical interfaces or different internal bus interfaces corresponding to each of the plurality of eSIM domains 310. In this case, an eSIM may act as a dual SIM. For example, an eSIM may simultaneously perform an operation associated with a plurality of profiles together with a processor.

According to certain embodiments, only some of the plurality of eSE domains 320 may be enabled, and the others may be disabled. For example, only an eSE domain associated with an operator activated using activated operator information of the plurality of eSIM domains 310 may be enabled among the plurality of eSE domains 320. The operator information may be, for example, an international mobile subscriber identity (IMSI), an integrated circuit card identifier (ICCID), or a public land mobile network (PLMN) in an ISD-P 316.

According to various embodiments, the IMSI may be data for each circuit, which is provided to identify a user. The IMSI may be information provided per application, such as a CDMA subscriber identity module (CSIM), an internet protocol multimedia service identity module (ISIM), or a universal subscriber identity module (USIM).

According to some embodiments, the ICCID may be a unique serial number of a SIM.

According to certain embodiments, the PLMN may be a network identification number of an operator. When an operator is previously registered with a preferred PLMN, when providing an overseas roaming service, an electronic device may access a network provided from the operator.

According to various embodiments, operator information and an operator state (e.g., an enable state, a disable state, or the like) may be kept in an LPA (e.g., an LPA 114 of FIG. 2) in the form of a table. According to some embodiments, the electronic device or the secure module 120 may obtain currently activated operator information when initiating an eSE service and may activate the eSE domain 320 which has the same information as the operator information or the APSD 323 in the eSE domain 320.

According to certain embodiments, when a user is located overseas, the electronic device or the secure module 120 may activate the eSE domain 320 of an operator associated with a corresponding operator (an operator in a preferred PLMN) or the APSD 323 in the eSE domain 320 using information provided from the inside of the ISD-P 316 other than the activated information.

According to various embodiments, the eSIM domain 310 and the eSE domain 320 may be arranged independently of each other and may be separated logically, or may be assigned such that at least some of the components included in the eSIM domain 310. For example, the eSIM domain 314 may be disposed in the eSE domain 320. Hereinafter, some embodiments is exemplified as the eSIM secure domain 314 is disposed in the eSE domain 320, with reference to FIG. 4.

Figure 3B:
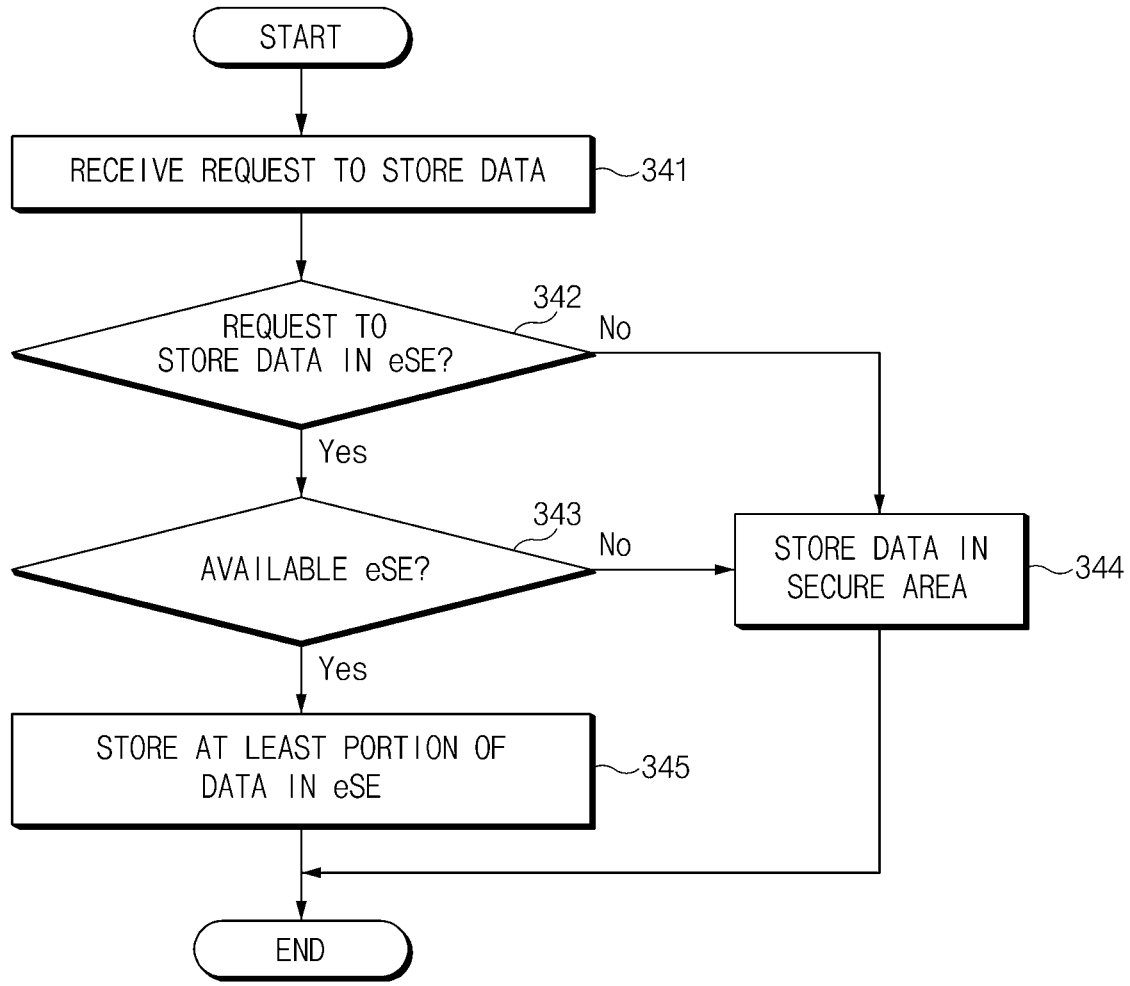
FIG. 3B illustrates operations of a method of storing data in a secure area or an eSE domain of a secure module according to various embodiments of this disclosure.

FIG. 3B illustrates operation of a method of storing data in a secure area or an eSE domain of a secure module according to certain embodiments.

Referring to the non-limiting example of FIG. 3B, in operation 341, a secure area (e.g., a TEE 116 of FIG. 2) may receive a request to store specified data (e.g., biometric recognition information such as fingerprint information, or payment related information) from a normal area (e.g., an REE 113 of FIG. 2). For example, the request may be configured to be generated from a user through an interface of an application or be automatically generated when a specified application (e.g., a payment application) is executed.

In operation 342, the secure area may determine whether there is a request to store the data in an eSE domain (hereinafter referred to as "eSE") (e.g., an eSE domain 320 of FIG. 3A). The secure area may determine an area to store the data based on information included in the request. For example, the secure area may be configured to, when information indicating a security level is greater than or equal to a specified value, store the data in the eSE. The secure area may be configured to, when the information indicating the security level is less than the specified value, store the data in a memory (e.g., a memory 130 of FIG. 1A) managed in the secure area. According to various embodiments, the secure area may determine a storage location based on a type of the data. For example, the secure area may verify a security level included in each data. The secure area may store data with a relative low security level (e.g., a feature point of fingerprint data or iris recognition data) in a memory (e.g., the memory 130 of FIG. 1A) accessible in a normal area or the secure area and may store data with a relatively high security level (e.g., a ridge of fingerprint data, a key with which the fingerprint data is encrypted, a key with which iris data is encrypted, or the like) in the eSE.

In operation 343, when there is the request to store the data in the eSE, the secure area may determine whether there is an available eSE.

When there is no the request to store the data in the eSE, in operation 344, the secure area may store the data therein. Furthermore, when there is no the eSE or when the eSE is unavailable (e.g., when there is no key shared through a provisioning process, when it is necessary to reset the eSE, or the like), the secure area may store the data therein.

For example, when there is a reset request of an external server (e.g., a TSM) or when a shared key is lost or deleted due to damage of a memory area or an eSE, the secure area may proceed with a procedure of resetting the eSE. In this case, the secure area may fail to store the data in the eSE, and may temporarily store the data therein. After completing the reset procedure, when a key is shared through a provisioning process, the secure area may move and store the data in the eSE.

When there is the available secure module, in operation 345, the secure module may store the data in the eSE. The secure area may have a key shared with the eSE through the provisioning process. The secure area may establish a session with the eSE using the key and may transmit and receive the data through the session.

The data may be applied to various types of data, for example, payment information (e.g., a card number or a password), user recognition information (e.g., information about biometric recognition such as fingerprint recognition or iris recognition, or health information), or information a user wants to protect (e.g., privacy information such as a secret document, a diary, a photo, or an image).

Figure 4:
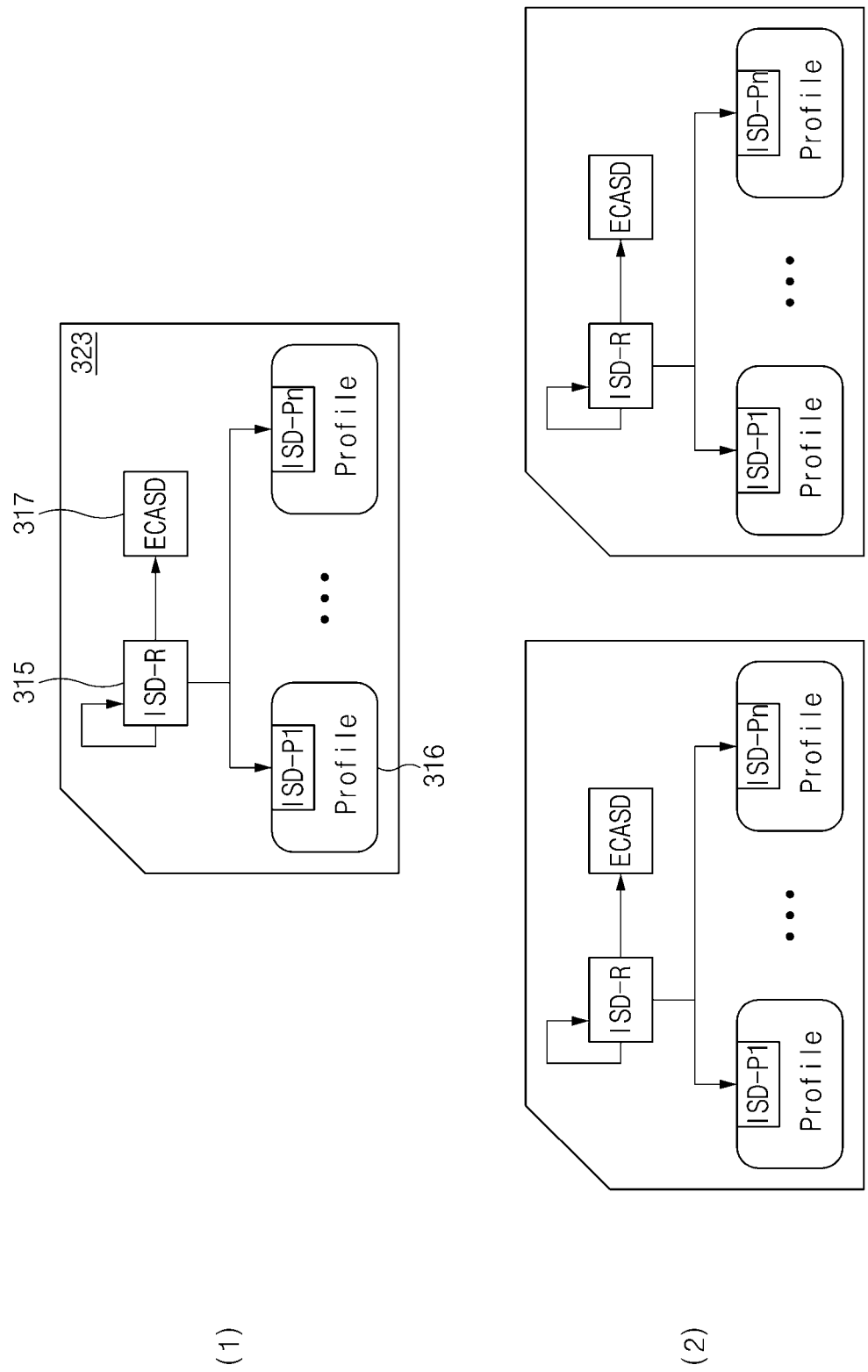
FIG. 4 illustrates an application provider security domain (APSD) in one secure module according to various embodiments of this disclosure.

FIG. 4 illustrates an APSD in one secure module according to certain embodiments.

Referring to the non-limiting example of FIG. 4, an eSIM secure domain (e.g., an eSIM secure domain 314 of FIG. 3A) may include an ISD-R 315, an ISD-P 316, or an ECASD 317. There may be the plurality of ISD-Ps 316 in the eSIM secure domain. In FIG. 4, the plurality of ISD-Ps 316 may be represented as an ISD-P1, . . . , ISD-Pn (herein, n is an integer of greater than or equal to 1) The ISD-P 316 may have a relationship associated with the ISD-R 315 and/or the ECASD 317. Hereinafter, for convenience of description, the ISD-R 315, the ISD-P 316 associated with the ISD-R 315, and the ECASD 317 may be referred to as an eSIM secure domain entity.

According to various embodiments, one eSIM secure domain or a plurality of eSIM secure domains may be included in one secure module (e.g., a secure module 120 of FIG. 2). The one eSIM secure domain may correspond to one eSIM, and the plurality of eSIM secure domains may correspond to a plurality of eSIMs. An electronic device capable of being loaded with the plurality of eSIMs may be conceptually referred to as an electronic device having a multi-SIM. The electronic device having the multi-SIM may be understood as a device capable of simultaneously enabling several profiles. In this case, when the electronic device includes a plurality of eSIM domains and when profiles in each eSIM domain are enabled one by one, the electronic device may simultaneously support a plurality of network services associated with each profile. For example, the electronic device may support a dual SIM dual standby (DSDS) system or a dual SIM dual activity (DSDA) system.

According to some embodiments, the eSIM secure domain may be established in an APSD of at least one of eSE domains. In (1) of FIG. 4, certain embodiments is exemplified as one eSIM domain entity 315 to 317 is assigned to one APSD 323. In (2) of FIG. 4, various embodiments is exemplified as each of a plurality of eSIM domain entities are assigned to one APSD. As shown in (2) of FIG. 4, when the plurality of eSIM secure domain entities are assigned to a secure module, the secure module (e.g., a secure module 120 of FIG. 3A) may operate as a multi-SIM.

The APSD 323 to which the eSIM secure domain entity is assigned may communicate with an external processor via different physical interfaces, each of which is assigned to the APSD 323. For example, different ISO interfaces may be assigned to the APSDs 323, respectively. The APSD 323 may communicate with the external processor via an ISO interface assigned thereto. Thus, as shown in (2) of FIG. 4, when the plurality of eSIM secure domain entities are assigned to the secure domain, the secure module may operate as a multi-SIM via a plurality of different physical interfaces. According to some embodiments, although the plurality of eSIM secure domain entities are assigned, there may be one LPA which manages the plurality of eSIM secure domain entities in the electronic device.

Figure 5:
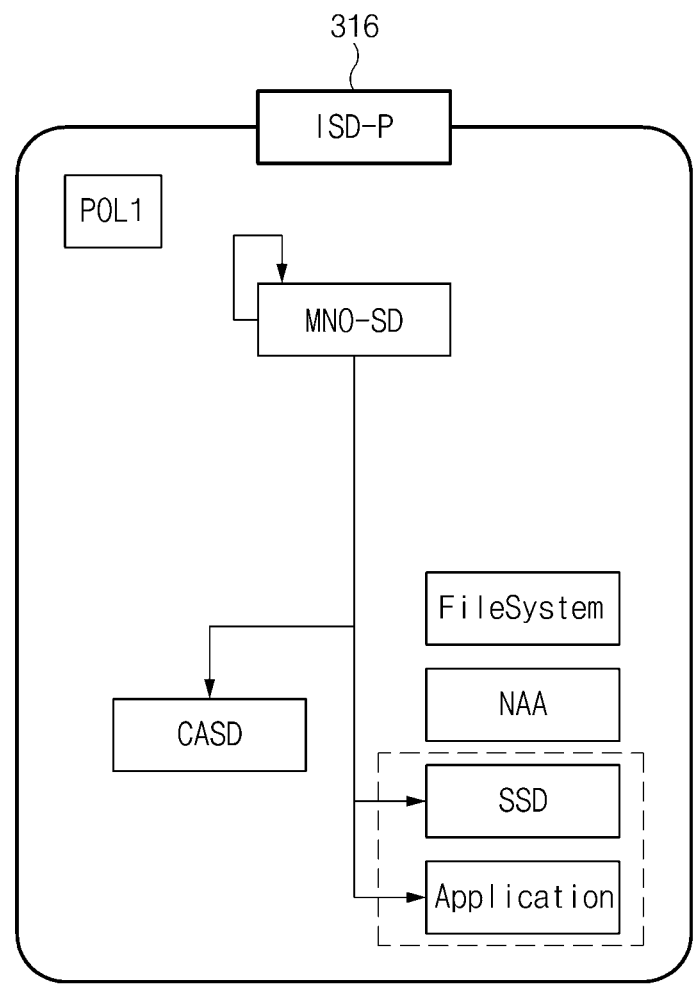
FIG. 5 illustrates an eSIM profile structure according to certain embodiments of this disclosure.

FIG. 5 illustrates an eSIM profile structure according to certain embodiments.

According to various embodiments, a profile package may be stored in an ISD-P 316 (e.g., an ISD-P 316 of FIG. 3A). According to some embodiments, the ISD-P 316 may include a policy rule module poll, an MNO-secure domain (MNO-SD) module, a network access application (NAA), a sub security domain (SSD), an application, a controlling authority security domain (CASD), and a filesystem. The SSD, the application, and/or the CASD thereof may be an optional component.

According to certain embodiments, the policy rule module poll may be a module which provides a rule applied to all profiles. The policy rule module poll may provide a policy rule associated with a profile, for example, disabling of this profile not allowed, deletion of this profile not allowed, or profile deletion is mandatory when it is disabled.

According to various embodiments, the MNO-SD module may establish an over the air (OTA) channel with an MNO and may manage a profile. The NAA may be an application which provides an authentication algorithm for network access and/or user information. For example, the NAA may be a USIM, a code division multiple access (CDMA) SIM (CSIM), or an internet protocol (IP) SIM (ISIM).

According to some embodiments, the SSD may be a security application provided by a third party. The security application may include, for example, a payment application or a transit application.

According to certain embodiments, the application may include an application provided by an MNO. For example, the application may include a SIM tool kit or a phone book.

According to various embodiments, the CASD module may be a module which stores an encryption key of an application which uses the SSD. According to some embodiments, the filesystem may include files used by the application, for example, a master file (MF), an application dedicated file (ADF), and/or an elementary file (EF).

According to certain embodiments, an electronic device may proceed with network authentication and registration using at least a portion of profile information to be registered with a network provided by a specific operator. In this case, the electronic device may proceed with the network authentication and registration through the following procedure. For example, a procedure of verifying subscriber information, generating an authentication vector, authenticating the network, generating an authentication response value, and authenticating a secure module may be performed between the electronic device and the network.

According to various embodiments, the electronic device may verify the subscriber information. The electronic device may read the subscriber information and may transmit the subscriber information to the network (e.g., a home location register/authentication center (HLR/AuC)) based on a PLMN value.

According to some embodiments, the electronic device may generate the authentication vector. The network may generate the authentication vector using a key which is shared with the secure module based on the subscriber information and may transmit the authentication vector to the secure module.

According to certain embodiments, the electronic device may authenticate the network. The secure module of the electronic device may verify the authentication vector obtained from the network using the key.

According to various embodiments, the electronic device may generate the authentication response value. The secure module of the electronic device may generate the authentication response value and may transmit the authentication response value to the network.

According to some embodiments, the network may authenticate the secure module. The network may compare an authentication response value received from a SIM card with an authentication response value generated by the network and may complete the authentication.

Figure 6:
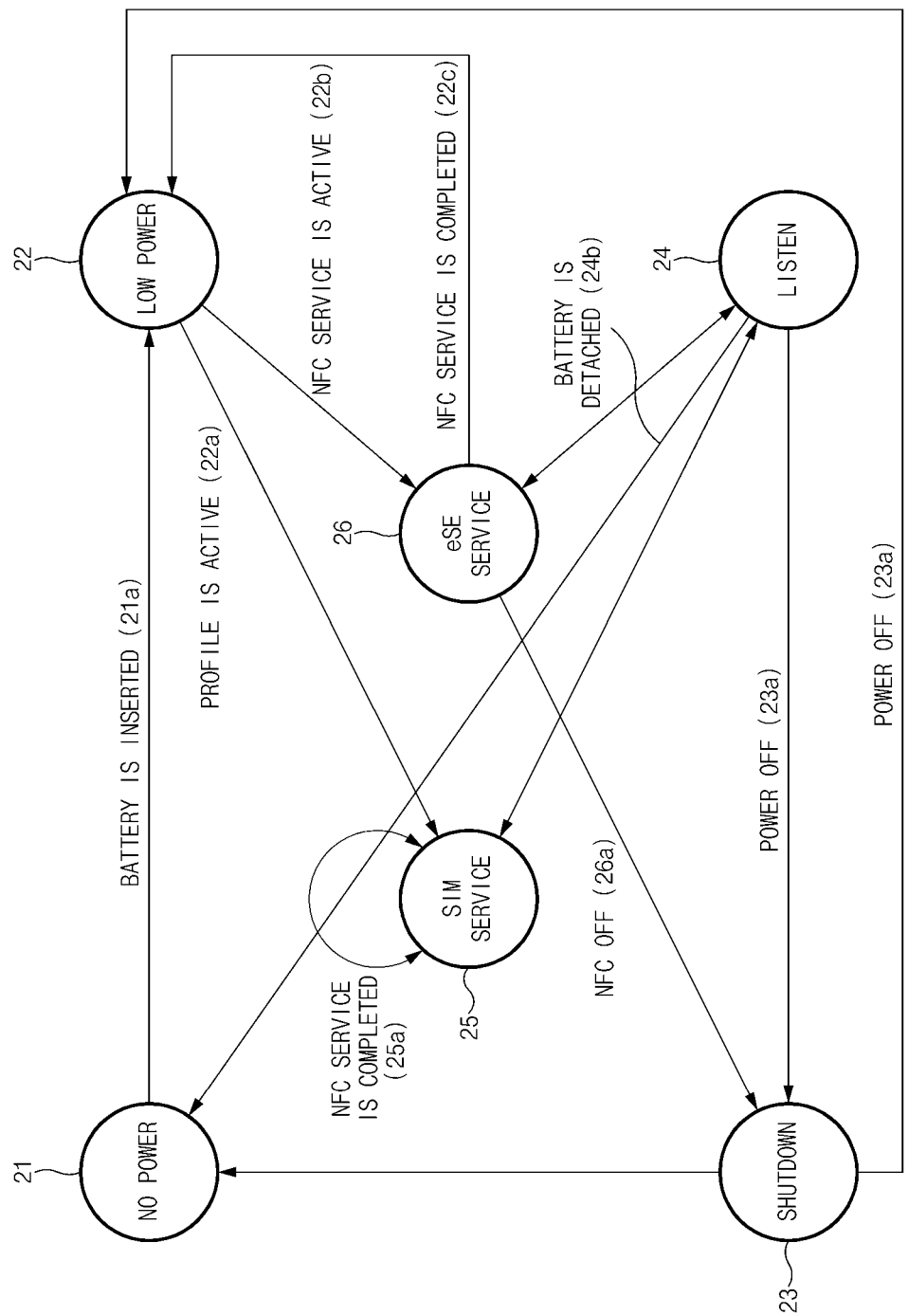
FIG. 6 illustrates a state of a secure module according to some embodiments of this disclosure.

FIG. 6 illustrates a state of a secure module according to certain embodiments of this disclosure.

Referring to the non-limiting example of FIG. 6, a secure module (e.g., a secure module 120 of FIG. 2) may operate in a no-power state 21, a low-power state 22, a shutdown state 23, a listen state 24, a SIM service state 25, or an eSE service state 26. According to certain embodiments, the SIM service state 25 may be a state where the secure module provides a service associated with a first area (e.g., a service provided from an eSIM or eUICC), and the eSE service state 26 may be a state where the secure module provides a service associated with a second area of the secure module. The service associated with the first area may be, for example, a communication service, and the service associated with the second area may be, for example, mobile phone unlock, a transportation card service, a credit card service, an ID card service, or the like.

The no-power state 21 may be a state where there is no battery which supplies power to the secure module in an electronic device. When a battery is inserted in the no-power state 21, the secure module may change to the low-power state 22.

The shutdown state 232 may be a state where system initialization (e.g., a state where a power turn-on procedure is successfully completed) is completed since power of greater than or equal to or greater than a specific value is supplied to the entire system including an AP, a CP, and the like, but where an LPA is inactive or where one of an NFC module or a kernel is inactive. When the LPA is inactive, the secure module may be in an eSIM shutdown state. When one of the NFC module or the kernel is inactive, the secure module may be in an eSE shutdown state. In other words, when an operation associated with first security information is inactive, the secure module may be in the eSIM shutdown state. When an operation associated with one of second security information or third security information is inactive, the secure module may be in the eSE shutdown state. For example, when the entire system is powered off in the listen state 24 of the secure module, the secure module may change to the low-power state through the shutdown state 23.

The low-power state 22 may be a state where a processor is powered off since power is not supplied or since power of less than or equal to or less than a specific value is supplied to the processor or the like and may be a state where it is impossible to provide a SIM service of the secure module (or a service associated with the first security information) or a service associated with biometric information (or a service associated with third security information). Herein, when an NFC service is active (22b) to provide a limited card service (e.g., a transportation card service), the secure module in the low-power state 22 may change to the eSE service state 26. For example, the eSE service may be performed through an SWP. When the NFC service is completed in the eSE service state 26 (22c), the secure module may change to the low-power state 22.

The listen state 24 may be a state where system initialization (e.g., a state where a power-on procedure is normally completed) is completed since power of greater than or equal to or greater than the specific value is supplied to the entire system including the processor or the like. The listen state 24 may include an eSIM listen state or an eSE listen state. When the LPA is active, the secure module may be in the eSIM listen state. When one of the NFC module or the kernel is active, the secure module may be in the eSE listen state. The secure module in the listen state 24 may be a state where a SIM service and/or an eSE service is inactive.

Although an NFC service is completed (25a) while the SIM service is provided in the SIM service state 25, the secure module may stay in the SIM service state 25.

When a profile corresponding to at least one eSIM domain among a plurality of eSIM domains is activated (22a) or when the LPA should be accessed to an eSIM domain, the secure module may change to the SIM service state 25.

When the LPA should access the eSIM domain may include, for example, when the secure module performs a SIM service (e.g., when a profile is downloaded, disabled, enabled, or deleted) or when the secure module communicates with a CP (e.g., network authentication or the like). While a service associated with an eSE (e.g., a biometric information request of the kernel, a card information request of the NFC module, or the like) is nor provided, the secure module may maintain a listen state for an eSE service, in other words, an ESE listen state. In this case, power may be supplied to a portion of a configuration, interface, or block for an eSE service as well as a SIM service.

According to various embodiments, when at least one profile is active (e.g., when initial network authentication is completed using information about the profile after the at least one profile is active), the secure module may be in the SIM service state 25 while it does not communicate with a CP or an LPA. Since it takes a long time for initial network authentication when a profile is active in case of an eSIM, when specific information (e.g., a profile state requested by the LPA or a service provider name (SPN) which currently uses the CP) is required while the secure module does not communicate with the CP or the LPA, the secure module may transmit and receive the information. In this case, the secure module may regard a current state as the SIM service state 25. When an NFC module is turned off in the eSE service state 26, the secure module may be in the shutdown state 23. For example, the secure module may be in the shutdown state 23 (e.g., a state where power supply is stopped or a state where the secure module is not operated) by a CP or an AP.

According to some embodiments, when one or more applets (e.g., a transportation card) are active in an eSE domain in the secure module or when the AP (or kernel) or the NFC module should access the eSE domain (e.g., when the AP requests second security information or when the NFC module requests third security information), the secure module may change to the eSE service state 26. Herein, when a service using an eSIM (e.g., communication with the LPA or the CP) is not performed, the secure module may maintain a listen state for a SIM service.

An eSE domain and/or a physical interface connected with the eSIM domain may exist independently. When changing from the SIM service state 25 to the eSE service state 26, an eSE service may be performed independently of a SIM service. In this case, when a service using an eSIM is not performed, the secure module may maintain the listen state 24 for a SIM service. In this case, power may be supplied to a portion of a configuration, interface, or block for the SIM service as well as the eSE service.

After the SIM service is completed (e.g., after network authentication is performed using a profile in an eSIM), an eSE reset request described below may be performed. The SIM service may be a social network service (SNS), a streaming service, or the like. For example, when an eSE reset request occurs while a text service is performed after network initialization, the secure module or the processor may complete the text service and may reset the secure module. After an eSIM domain initializes network authentication, the eSE domain may perform a stopped service again.

When a battery is detached or separated from the electronic device in the listen state 24, the secure module may change to the no-power state 21.

According to certain embodiments, while the secure module proceeds with the SIM service or the eSE service, in response to a request of the SIM service and/or the eSE service from the LPA and/or the CP or the AP and/or the NFC module, when the secure module is unable to provide a successful response, it may be necessary to reset the secure module. For example, when the secure module is unable to transmit a command within a predetermined time due to noise, over delay, or the like, it may be necessary to reset the secure module.

As such, when it is necessary to reset the secure module, the electronic device may change a performed service (e.g., an eSE service) to the listen state 24 and may determine whether another service (e.g., a SIM service) is active. When the other service is active, the secure module may wait for completing the other service. When the other service is completed, the secure module may be reset. The reset may be implemented as a warm reset (e.g., an operation system (OS) reset) or a cold reset (e.g., a power reset).

According to various embodiments, after completing the reset, the secure module may provide a service again. The secure module may perform a service (e.g., an eSE service) which does not reply previously and a service (e.g., a SIM service) which is previously and successfully performed.

According to some embodiments, the SIM service may include an operation of communicating between the secure module and the CP or between the secure module and the LPA or a service provided by the electronic device using information obtained through communication. For example, when a call progresses using network authentication information of a SIM, to prevent an eSE from being in an infinite listen state, when communication between the LPA and the secure module or between the CP and the secure module occurs, when the call is completed, the electronic device or the secure module may reset the secure module, an eSIM domain may perform a SIM initialization procedure (e.g., network authentication initialization), and an eSE domain may perform a service stopped before entering the listen state 24 and may complete the service.

Figure 7A:
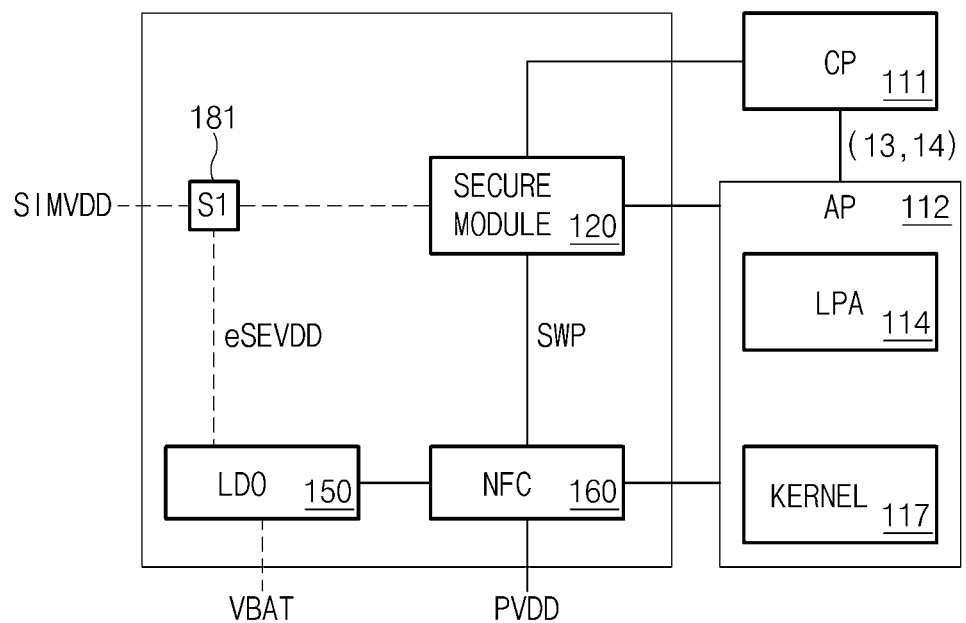
FIGS. 7A and 7B illustrate in block diagram format, configurations of electronic devices according to certain embodiments of this disclosure.
Figure 7B:
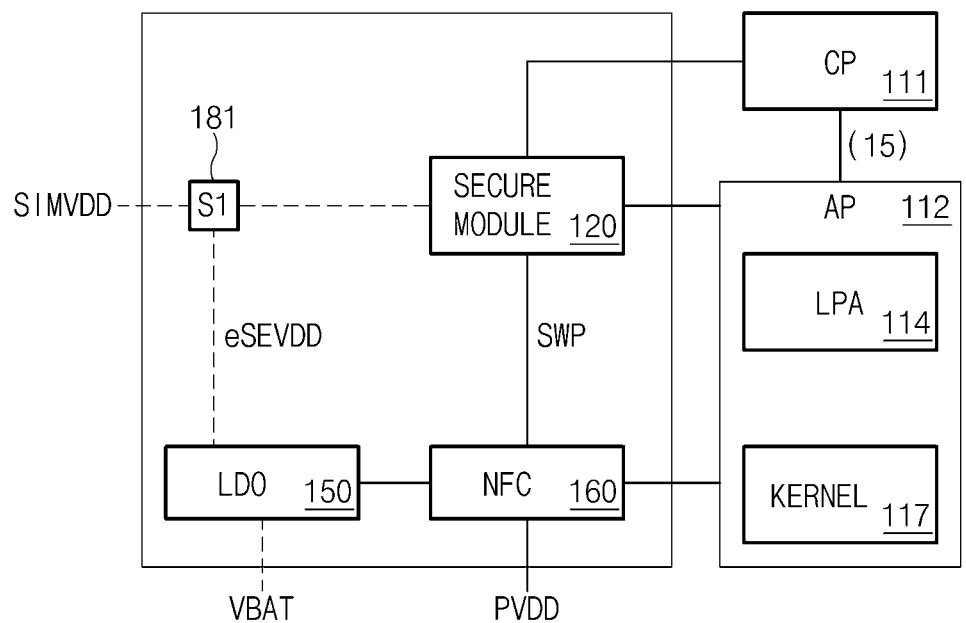

FIGS. 7A and 7B illustrate, in block diagram format, configurations of electronic devices according to certain embodiments. Additionally, FIGS. 7A and 7B illustrate, in block diagram format, examples of operations performed by embodiments according to this disclosure where an electronic device controls power of a secure module.

According to various embodiments, an operation of controlling power of a secure module may include a control operation using inter-process communication (IPC) between an AP and a secure module, between a CP and the secure module, or between an NFC module and the secure module.

FIG. 7A illustrates an example embodiment including a control operation using an external interface for IPC. A description will be given of a control operation using an internal interface for IPC with reference to FIG. 7B. However, various embodiments disclosed in the present disclosure are applicable to when an interface for IPC includes a combination of internal and external interfaces.

Referring to the non-limiting example of FIG. 7A, an AP 112 (e.g., an AP 112 of FIG. 2) and a CP 111 (e.g., a CP 111 of FIG. 2) in an electronic device (e.g., an electronic device 100 of FIG. 1A) may control power of a secure module 120.

According to some embodiments, the CP 111 may supply a high-level power to an eSIM domain to activate the eSIM domain of the secure domain 120. While the CP 111 performs an operation associated with the eSIM domain of the secure module 120, it may supply the high-level power to the eSIM domain. While performing the operation associated with the eSIM domain, the CP 111 may receive first security information from the secure module 120 or may provide the first security information to the secure module 120. For example, when the electronic device is during a call connection, during an initialization state of an eSIM, or when an LPA 114 (e.g., an LPA 114 of FIG. 2) is in use, the CP 111 may supply the high-level power to the secure module 120. To deactivate an eSIM domain, the CP 111 may supply a low-level power to the eSIM domain or may fail to supply power. The low-level power may include a power of 0 V.

According to certain embodiments, to activate an eSE domain of the secure module 120, the AP 112 or the NFC module 160 may supply a high-level power to the eSE domain. While performing an operation associated with the eSE domain, the AP 112 may receive second security information from the secure module 120 or may provide the second security information to the secure module 120, and the NFC module 160 may receive third security information from the second secure module 120 or may provide the third security information to the secure module 120. The AP 112 or the NFC module 160 may supply the high-level power to the secure module 120 during the operation associated with the eSE domain of the secure module 120. For example, while the AP 112 registers fingerprint information to an SPI or while the NFC module 160 accesses an applet using an SWP, the AP 112 or the NFC module 160 may supply the high-level power to the secure module 120. To deactivate the eSE domain, the AP 112 or the NFC module 160 may supply a low-level power to the eSE domain.

According to various embodiments, when the AP 112 or the CP 111 controls power, a state of the secure module 120 may become operationally relevant. For example, the secure module 120 may simultaneously activate a plurality of domains, the CP 111 should manage power supply with respect to a SIM service, and the AP 112 or the NFC module 160 should manage power supply of the secure module 120 with respect to an eSE service. Thus, the AP 112 or the CP 111 should consider an operation state or a power supply control state of the secure module 120 for another service other than a supported service. When any domain is operating in a situation where it is necessary to initialize (or reset) the secure module 120, it may not be suitable for immediately initializing the secure module 120. In this case, the AP 112 or the CP 111 may should an operation state of the secure module 120.

In this case, the electronic device may perform the following operation.

According to some embodiments, while the eSE domain is activated, the eSIM domain may be inactive. While the eSIM domain is activated, the eSE domain may be inactive. According to certain embodiments, an active state of the eSIM domain may correspond to an eSIM service state, and an active state of the eSE domain may correspond to an eSE service state.

To this end, the CP 111, the AP 112, or the NFC module 160 may supply power to the secure module 120 based on a state of the secure module 120. According to various embodiments, when obtaining a request associated with the eSIM domain, the CP 111 may control power of the secure module 120 based on a state of the eSE domain of the secure module 120. When obtaining a request associated with the eSE domain, the AP 112 or the NFC module 160 may supply power to the secure module 120 based on a state of the eSIM domain of the secure domain 120. When obtaining a request associated with second security information, the AP 112 may control power. When obtaining a request associated with third security information, the NFC module 160 may control power. For example, while an eSE service is provided (or when an eSE is activated), the CP 111 may fail to activate the eSIM domain. In this case, since a power of the secure module 120 is controlled to a low level after the eSE service, a situation where a SIM service response is not completed may be prevented.

According to some embodiments, while providing a SIM service (or in a state where the SIM domain is activated), the AP 112 or the NFC module 160 may activate the eSE domain and may fail to supply power through the AP 112. To prevent the secure module 120 from repeating network authentication initialization in a state where power is supplied by the CP 111 for the SIM service, power may continue being supplied to the secure module 120 after network initialization associated with a profile in an eSIM is performed. Since a power rail of a module is changed when the AP 112 supplies power, it may be prevented from having an influence on a previous SIM service.

According to certain embodiments, when it is necessary to initialize (or rest) the secure module 120 while any one domain is activated, the CP 111 or the AP 112 may defer initialization of the secure module 120 until a service of the any one domain is completed.

To this end, the CP 111 or the AP 112 may be connected to an interface for providing state information to verify a state between the CP 111 and the AP 112 or may include an interface for exchanging the state information.

Referring to the non-limiting example of FIG. 7A, the CP 111 and/or the AP 112 may be connected to an interface for providing state information. For example, the CP 111 may be connected to a third interface 13 for providing state information about power supplied from the CP 111. The AP 112 may be connected to a fourth interface 14 for providing state information about power supplied from the AP 112.

According to various embodiments, the third interface 13 and/or the fourth interface 14 may include a general purpose input output (GPIO) interface. For example, the third interface 13 and/or the fourth interface 14 may be a GPIO pin.

According to some embodiments, the third interface 13 may provide state information about power supplied from the CP 111. The power state information may indicate whether the CP 111 operates or whether the eSIM domain is activated. The CP 111 may verify (or obtain) whether the eSIM domain is activated or a state of power supplied from the CP 111, through the third interface 13.

According to certain embodiments, the fourth interface 14 may provide state information about power supplied from the AP 112. The power state information may indicate whether the AP 112 operates or whether the eSIM domain is activated. The AP 112 may verify whether the eSIM domain is activated or a state of power supplied from the AP 112, through the fourth interface 14. In this case, the AP 112 may verify a power state of the CP 111 using the third interface 13 and may verify a power state of the AP 112, thus delivering the verified result to the NFC module 160.

Referring to the non-limiting examples of FIGS. 7A and 7B, the electronic device may perform various embodiments disclosed in the present disclosure utilizing a variety of power sources.

According to various embodiments, VBAT may be a battery power. VBAT may be an input power of an LDO 150.

According to some embodiments, eSEVDD may be an output power of the LDO 150. In a state where SIMVDD is not generated in a low-power module where the electronic device (e.g., the electronic device 100 of FIG. 1A) is powered off, the electronic device may receive SIMVDD from its battery and may supply power necessary for the secure module 120. An output power of the LDO 150 may also be supplied to the NFC module 160 in the low-power module and may be replaced with PVDD.

Figure 11:
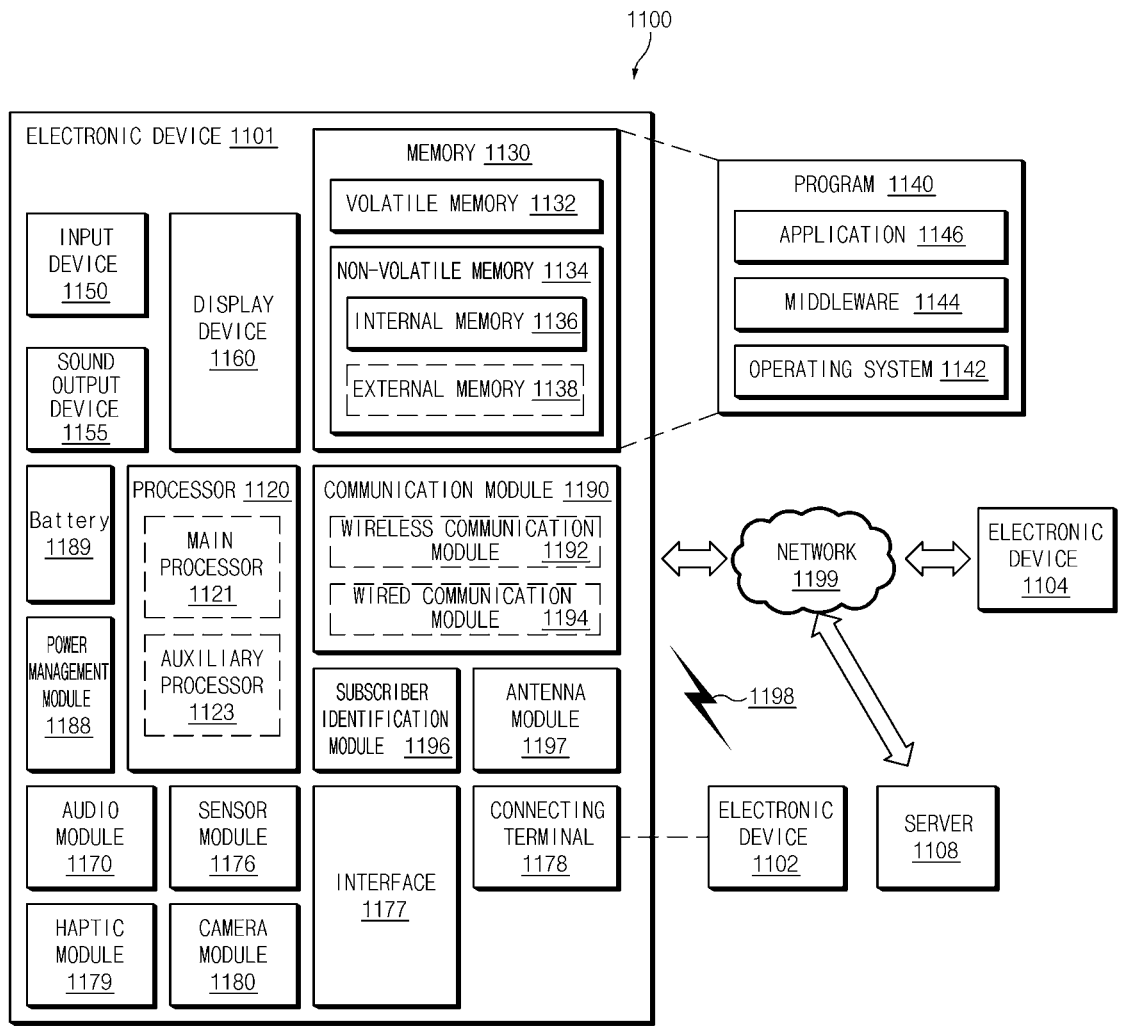
FIG. 11 illustrates, in block diagram format, an electronic device in a network environment according to various embodiments of this disclosure.

According to certain embodiments, SIMVDD may be power supplied from a power management module (e.g., a power management module 1188 of FIG. 11). SIMVDD may fail to be supplied in a low-power mode of FIG. 6.

According to various embodiments, PVDD may be a drive power of the NFC module 160. PVDD may be power supplied from the power management module (e.g., the power management module 1188 of FIG. 11).

In addition, various types of power are applicable to various embodiments disclosed in the present disclosure.

Referring to the illustrative example of FIG. 7B, a fifth interface 15 for transmitting and receiving control information for power control may be directly disposed between the CP 111 and the AP 112. The fifth interface 15 may be a communication bus. For example, the fifth interface 15 may be a radio interface layer (RIL) in the form of an internal bus, an inter-integrated circuit (I2C) which is an external physical interface, or the like.

According to some embodiments, the CP 111 may transmit a first power control request to the AP via the fifth interface 15 and may obtain a power control response in response to the first power control request. The AP 112 may transmit a second power control request to the CP 111 via the fifth interface 15 and may obtain a power control response in response to the second power control request.

According to certain embodiments, each of the third interface 13 and the fourth interface 14 of FIG. 7A may be an interface distinguished from the fifth interface 15 disposed between the CP 111 and the AP 112.

Hereinafter, a description will be given of an operation associated with the secure module 120, performed using the third interface 13 and/or the fourth interface 14 by the electronic device, and an operation associated with the secure module 120, performed using the fifth interface 15 by the electronic device.

Referring to the non-limiting example of FIG. 7A, the electronic device may verify state information associated with the secure module 120 through the third interface 13 and/or the fourth interface 14, and may activate an eSE or an eSIM of the secure module 120 based on the state information or may initialize the secure module 120. Hereinafter, an operation associated with activation will first be described, and an operation associated with initialization will be described later.

According to various embodiments, the CP 111 may provide power supplied to the secure module 120 through the third interface 13 or a SIM service state. The CP 111 may provide a high power level or a low power level through the third interface 13.

According to some embodiments, the AP 112 may provide power supplied to the secure module 120 through the fourth interface 14 or an eSE service state. The AP 112 may provide a high power level or a low power level through the fourth interface 14.

According to certain embodiments, the AP 112 may verify state information associated with the secure module 120 through the third interface 13 and may perform activation or power control for the eSE domain of the secure module 120 based on the state information. When verifying that the SIM service is being provided through the third interface 13, the AP 112 may activate the eSE domain and may fail to perform power control for the secure module 120.

The AP 112 may verify a power state of the CP 111 through the third interface 13. When the power state of the CP 111 is a high level, the AP 112 may determine that the SIM service is being provided.

When verifying that the eSIM domain is deactivated through the third interface 13, the AP 112 may supply power to the secure module 120 and may activate the eSE domain. For example, when obtaining a low power through the third interface 13, the AP 112 may supply power to the eSE domain to activate the eSE domain. The AP 112 may change a power state, transmitted through the fourth interface 14, from a low level to a high level. In this case, after waiting until the eSE service is completed, the CP 111 may activate the eSIM domain.

In other words, when power supply to the ESIM domain is activated, the AP 111 or the NFC module 160 may fail to perform power control and may start the eSE service. When the eSE domain is activated, the secure module 120 may fail to start the SIM service due to an initial network initialization process. When the eSE service is completed, the secure module 120 may start the SIM service. Each of the third interface 13 and the fourth interface 14 may include a plurality of interfaces. Each of the plurality of interfaces may provide a power supply state and a service state. For example, when providing a service (e.g., a phone call, an SNS, or the like) where it is necessary for a user to use first security information, the CP 111 may provide a service state indicating an active state through the plurality of interfaces. When a service which is in use by the user is completed, the CP 111 may provide a service state indicating an inactive state through the third interface 13. When there is a function which should be periodically performed by the CP 111 or the eSIM domain, for example, when location information of the electronic device is periodically updated during an idle time according to an operation of a SIM, since it is necessary to distinguish the function from a service to which an eSE should refer for reset, it may be necessary for the CP 111 to display a service state.

The AP 112 may change power supplied to the eSE domain from a low level to a high level. In this case, the AP 112 may change state information provided through the fourth interface 14. The AP 112 may change a power state indicated by the state information from a low level to a high level. In this case, the electronic device may deactivate an eSIM, but may fail to activate the eSIM.

According to various embodiments, while the eSE service is provided, the CP 111 may fail to activate the eSIM domain. When the eSE service is completed, the CP 111 may activate the eSIM domain.

According to some embodiments, the CP 111 may determine whether the eSE service is being provided through the fourth interface 14. The CP 111 may verify power state information indicating power supplied to the secure module 120 by the AP 112 and may activate the eSIM domain of the secure module 120 based on the power state information. For example, when the AP 112 or the NFC module 160 controls a power of the eSE domain for the eSE service, the CP 111 may fail to control a power of the eSIM domain. Due to this, the CP 111 may fail to change the eSIM domain from an inactive state to an active state.

When verifying a high level through the fourth interface 14, although a request associated with an eSIM occurs, the CP 111 may wait without activating the SIM service until verifying a low level through the fourth interface 14. In other words, the CP 111 may wait without supplying power to the secure module 120. Alternatively, the CP 111 may defer an operation for the request associated with the eSIM. When verifying the low level through the fourth interface 14, the CP 111 may activate the eSIM domain. In this case, the CP 111 may change a power state, provided through the third interface 13, from a low level to a high level. An operation associated with activating the eSIM domain may refer to the related standard specification.

According to certain embodiments, the CP 111 may verify state information associated with the secure module 120 through the fourth interface 14 and may initialize the secure module 120 based on the state information.

According to various embodiments, when obtaining a request associated with initializing the secure module 120, the CP 111 may determine whether the eSE service is being provided through the fourth interface 14. When the eSE service is being provided, the CP 111 may defer an operation for the request associated with initializing the secure module 120. When verifying that the eSE service is completed, the CP 111 may initialize the secure module 120.

In this case, when the eSE service is completed, the AP 112 may change state information, provided through the fourth interface 14, from a high level to a low level, and the CP 111 may initialize the secure module 120 in response to the change in the state information. In this case, the CP 111 may display state information, provided through the third interface 13, at a high level.

According to some embodiments, the CP 111 may change power supplied to the secure module 120 to a low level for initialization of the secure module 120 or may control a first switch 181 to block power. For example, the CP 111 may change SIMVDD to a low level or may change an output power of the LDO 150 controlled by the AP 112 or the NFC module 160 to a low level. VBAT may be a power supplied to the LDO 150 and may be a battery power. VBAT may be supplied as an input power of the LDO 150 in a low-power state 22 of FIG. 6 to activate the eSE domain. Herein, since the CP 111 and the AP 112 are turned off in the low-power state 22, an eSIM operation may fail to be performed. When controlling an output power of the LDO 150 or SIMVDD to a low level to initialize the secure module 120, the AP 111 or the NFC module 160 may control the first switch 181. For example, the CP 112 may verify an eSE service state (e.g., an eSE service state 26 of FIG. 6). When the eSE service is completed, the CP 112 may request the AP 111 or the NFC module 160 to activate the eSIM. Obtaining the request, the AP 111 and the NFC module 160 may change an input of the first switch 181 to SIMVDD. When the change is completed, the AP 111 or the NFC module 160 may notify the CP 111 that the change is completed. The CP 111 may provide state information indicating a high level through the third interface 13 and may supply SIMVDD. For example, the CP 111 may change the first switch 181 to be connected from SIMVDD to eSEVDD. Alternatively, the CP 111 may control the first switch 181 to be sequentially connected to SIMVDD, eSEVDD, and SIMVDD.

Referring to the non-limiting example of FIG. 7B, the AP 112 and/or the CP 111 may obtain control information associated with the secure module 120 through the fifth interface 15 and may exchange the right to control power.

According to certain embodiments, when receiving a request to activate the eSIM domain in an eSE service state, the CP 111 may request the AP 112 to hand over the right to control power and/or may request the AP 112 and the NFC module 160 to set up a switch (e.g., the first switch 181), through the fifth interface 15.

According to various embodiments, in the eSE service state, the AP 112 may control power associated with the secure module 120 or the eSE domain. When a request to activate the eSIM domain in the eSE service state occurs, the CP 111 may request the AP 112 to hand over the right to control power. For example, the CP 111 may transmit a power control request to the AP 112 through the fifth interface 15.

According to some embodiments, the AP 112 may transmit a power control response to the CP 111 based on the eSE service state, in response to the power control request. The AP 112 may fail to transmit the power control response when he ESE service is in progress or may transmit a response for providing a notification that the eSE service is being provided to the CP 111. In this case, the AP 112 may explicitly or implicitly request the CP 111 to wait for a power control response. The AP 112 may transmit the power control response to the CP 111 and may hand over the right to control power to the CP 111.

According to certain embodiments, the AP 112 may change the first switch 181 to SIMVDD before transmitting the power control response to the CP 111 and may transmit the power control response to the CP 111.

According to various embodiments, the CP 111 may obtain the power control response and may activate the eSIM. For example, the CP 111 may supply a high-level power to the eSIM domain. The CP 111 may perform an eSIM initialization procedure.

According to some embodiments, when a problem in the eSE domain while the SIM service is provided occurs, it may be necessary to initialize the secure module 120 or the AP 112. In this case, the AP 112 may request the CP 111 to perform power control to initialize the secure module 120.

According to certain embodiments, when a request to initialize the secure module 120 or the AP 112 during the eSE service occurs, the AP 112 may transmit a power control request to the CP 111. The CP 111 may obtain the power control request and may defer an operation for the power control request until the SIM service is completed. When the SIM service is completed, the CP 111 may stop supplying power in response to the power control request.

According to various embodiments, the SIM service may be a service directly or indirectly associated with the eSIM domain. For example, the service directly associated with the eSIM domain may be a service, such as profile download, which requires a read or write operation for the eSIM domain. The service indirectly associated with the eSIM domain may be a service (e.g., call reception, call origination, SMS transmission and reception, or the like) provided based on network registration based on a profile after initializing the eSIM domain.

According to some embodiments, in a state where the electronic device is powered off, the NFC module 160 may access the secure module 120. When the NFC module 160 accesses the eSE domain of the secure module 120, power may be supplied to the secure module 120 by the LDO 150. In this case, the NFC module 160 may access the secure module 120 through an SWP, and the LDO 150 may supply VBAT.

The LDO 150 may supply power to the secure module 120 through the first switch 181. The AP 112 or the CP 111 may control the first switch 181 to be connected to the LDO 150.

The electronic device (e.g., the electronic device 100 of FIG. 1A) may include one chip including the secure module 120 (e.g., a secure module 120 of FIG. 2), the LDO 150, the NFC module 160, or the first switch 181.

Figure 8:
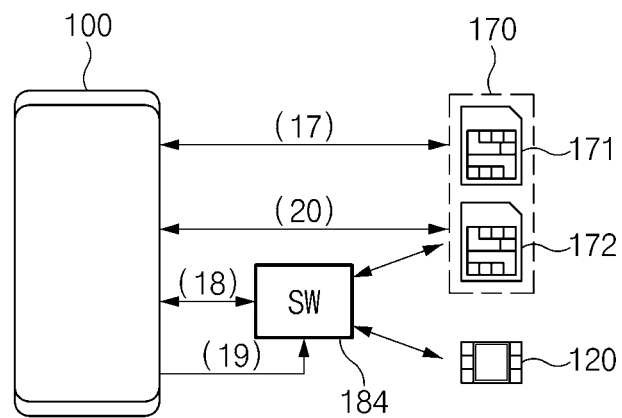
FIG. 8 illustrates an electronic device including a secure module and a legacy secure module according to some embodiments of this disclosure.

FIG. 8 illustrates an electronic device including a secure module and a legacy secure module according to various embodiments of this disclosure.

According to certain embodiments, a plurality of secure modules may be included in an electronic device 100. According to various embodiments, the plurality of secure modules may include a secure module 120 (e.g., a secure module 120 of FIG. 2) and at least one legacy secure module 171 and 172.

According to some embodiments, the at least one legacy secure module 171 and 172 may be a SIM or eSIM which provides subscriber information or an external memory (e.g., a secure digital (SD) card) capable of storing user information (e.g., a photo or the like). According to certain embodiments, the at least one legacy secure module 171 and 172 may be arranged in a secure module tray 170 and may be separated from the electronic device 100. According to various embodiments, the at least one legacy secure module 171 and 172 may be a secure module which supports one protocol.

At least one processor in the electronic device 100 may detect the at least one legacy secure module 171 and 172 of the secure module tray 170 through a sensing interface.

According to some embodiments, the electronic device 100 may communicate with the secure module 120 and the at least one legacy secure module 171 and 172 using communication interfaces 17 and 18. For example, the electronic device 100 may communicate with the first legacy secure module 171 through the first communication interface 17 and may communicate with the second legacy secure module 172 and the secure module 120 through the second communication interface 18. The first communication interface 17 and/or the second communication interface 18 may include a first interface 11*a* or a second interface 11*b* of FIG. 1A. For example, the communication interface 17 or 18 may be an ISO interface.

According to certain embodiments, to manage the two or more secure modules 172 and 120 using the second communication interface 18, the electronic device 100 may include a switch 184. The switch 184 may electrically connect any one of the secure module 120 or the second legacy secure module 172 with a processor (e.g., a CP) of the electronic device 100.

The electronic device 100 may further include a control interface 19 to control the switch 184. The control interface may be, for example, a GPIO.

According to various embodiments, when the legacy secure module 171 or 172 supports an external memory (e.g., SD card, universal flash storage (UFS) card, or the like) function, the electronic device 100 may further include an interface 20 for communication with the external memory. In this case, the interface 20 may be electrically connected with a processor (e.g., an AP) of the electronic device 100. The interface 20 may include an SD interface or a UFS interface, which is a memory interface.

According to some embodiments, the electronic device 100 may deactivate the secure module 120 while the legacy secure module 172 included in the secure module tray 170 is activated and may activate the secure module 120 while the legacy secure module 172 is deactivated.

Figure 9A:
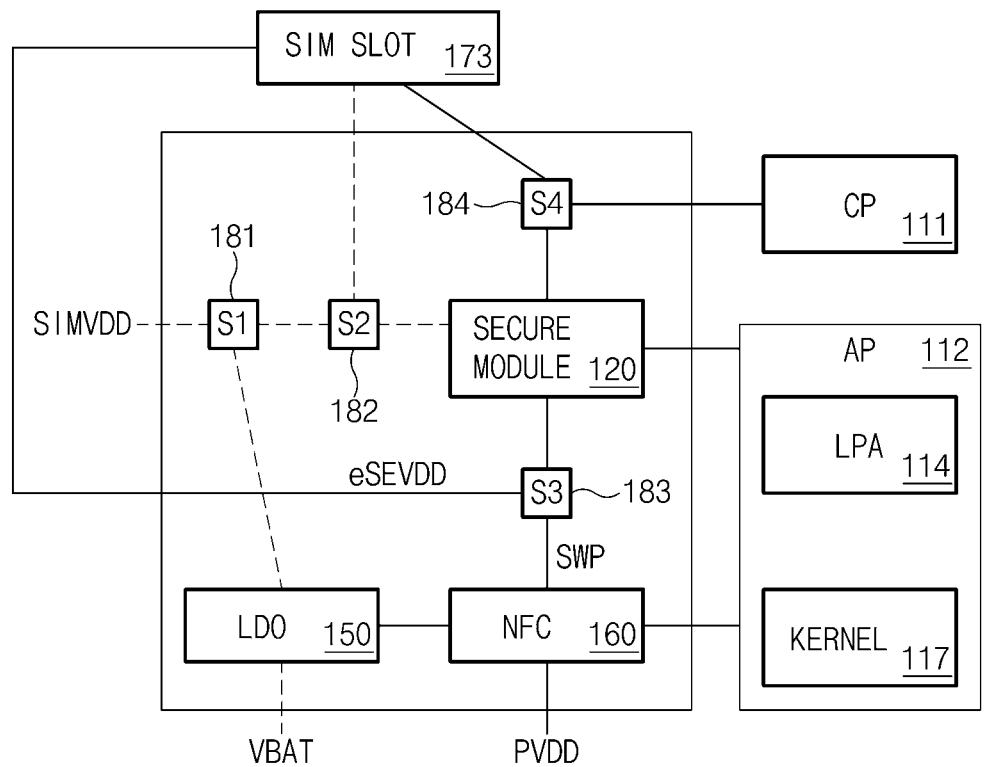
FIGS. 9A and 9B illustrate, in block diagram format, configurations of electronic devices according to various embodiments of this disclosure.
Figure 9B:
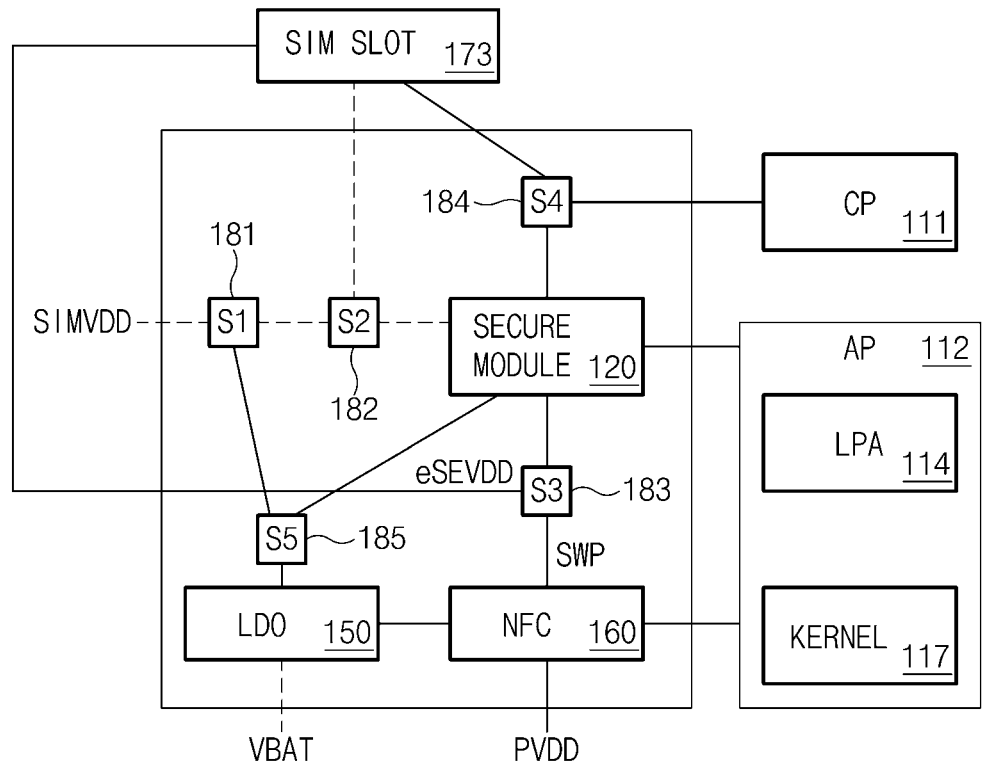

FIGS. 9A and 9B illustrate, in block diagram format, configurations of electronic devices according to various embodiments of this disclosure.

Referring to the non-limiting example of FIG. 9A, in addition to components shown in FIGS. 7A and 7B, an electronic device (e.g., an electronic device 100 of FIG. 1A) may further include a SIM slot 173 capable of mounting a legacy secure module (e.g., legacy secure modules 171 and 172 of FIG. 8), a first switch 181 for selecting one of SIMVDD controlled by a CP 111 or an LDO 150 controlled by an AP 112 or an NFC module 160 (or power supplied by the LDO 150), a second switch 182 for selectively supplying power to one of a secure module 120 and the SIM slot 173, a third switch 183 for connecting one of the secure module 120 or the SIM slot 173 with a third interface for obtaining third security information, a fourth switch (e.g., a switch 184 of FIG. 8) for selectively connecting one of the secure module 120 or the SIM slot 173 with the CP 111, the LDO 150, and the NFC module 160.

According to certain embodiments, while an eSIM domain of the secure module 120 is deactivated and while the legacy secure module mounted on the SIM slot 173 is activated, the fourth switch 184 may connect the SIM slot 173 with the CP 111. The CP 111 may be connected to the SIM slot 173 (or the legacy secure module) through the fourth switch 184 to perform an operation associated with the legacy secure module. For example, the legacy secure module may transmit stored information to the CP 111 or may obtain the stored information from the CP 111. In this case, the stored information may be provided to a first interface 11*a* of FIG. 1A.

The first switch 181 may allow a user to select a power supply source (e.g., SIMVDD) for activating the secure module 120 or the SIM slot 173, and the second switch 182 may select the SIM card 173 such that SIMVDD is supplied to the SIM slot 173 through the first switch 181 and the second switch 182. The first switch 181 may select the LDO 150 for an NFC service while power is turned off to supply power to the SIM slot 173 or the secure module 120. The electronic device may obtain information for the NFC service through an SWP interface from the SIM slot 173 or the secure module 120 using the third switch 183 to which power is supplied.

According to various embodiments, the LDO 150 may directly receive VBAT which is a battery voltage and may supply power. As a result, when the electronic device is powered off, the NFC service may be provided. Herein, since the electronic device is powered off, the CP 111 may also be powered off. In this case, a SIM service may fail to be provided.

According to some embodiments, the NFC module 160 may provide a transit service (e.g., a transportation card service, a mobile credit card service, or the like). When accessing a transit applet, the NFC module 160 may access the legacy secure modules 172 and 173 disposed at the SIM slot 173 or an eSE domain of the secure module 120, through the third switch 183 based on a predetermined priority. In this case, the NFC module 160 connected with the third switch 183 may receive information using an SWP to obtain third security information from the legacy secure modules 172 and 173 or the secure module 120.

Referring to the non-limiting example of FIG. 9B, the electronic device may further include a fifth switch 185 for supplying an LDO power to the secure module 120 or the SIM slot 173. For example, while SIMVDD is supplied to the SIM slot 173 through the first switch 181 and the second switch 182, when power should be supplied to the secure module 120 (e.g., when an eSE service is required or when an LPA 114 needs an eSIM service (e.g., a service of deleting or enabling a profile)), the electronic device may control the fifth switch 185 to supply a power of the LDO 150 to the secure module 120. Alternatively, while the system is turned off, the electronic device may control the fifth switch 185 to supply a power of the LDO 150 to the secure module 120 or the SIM slot 173. For example, when the system is turned off, it may be unnecessary to generate SIMVDD in a power device of the system. In this case, the LDO 150 may receive an input power through a VBAT connected with its battery, and may supply power to the secure module 120 through the fifth switch 185 or may supply power to the SIM slot 173 through the fifth switch 185, the first switch 181, and the second switch 182 to supply power to the legacy secure module in the SIM slot 173.

Figure 10:
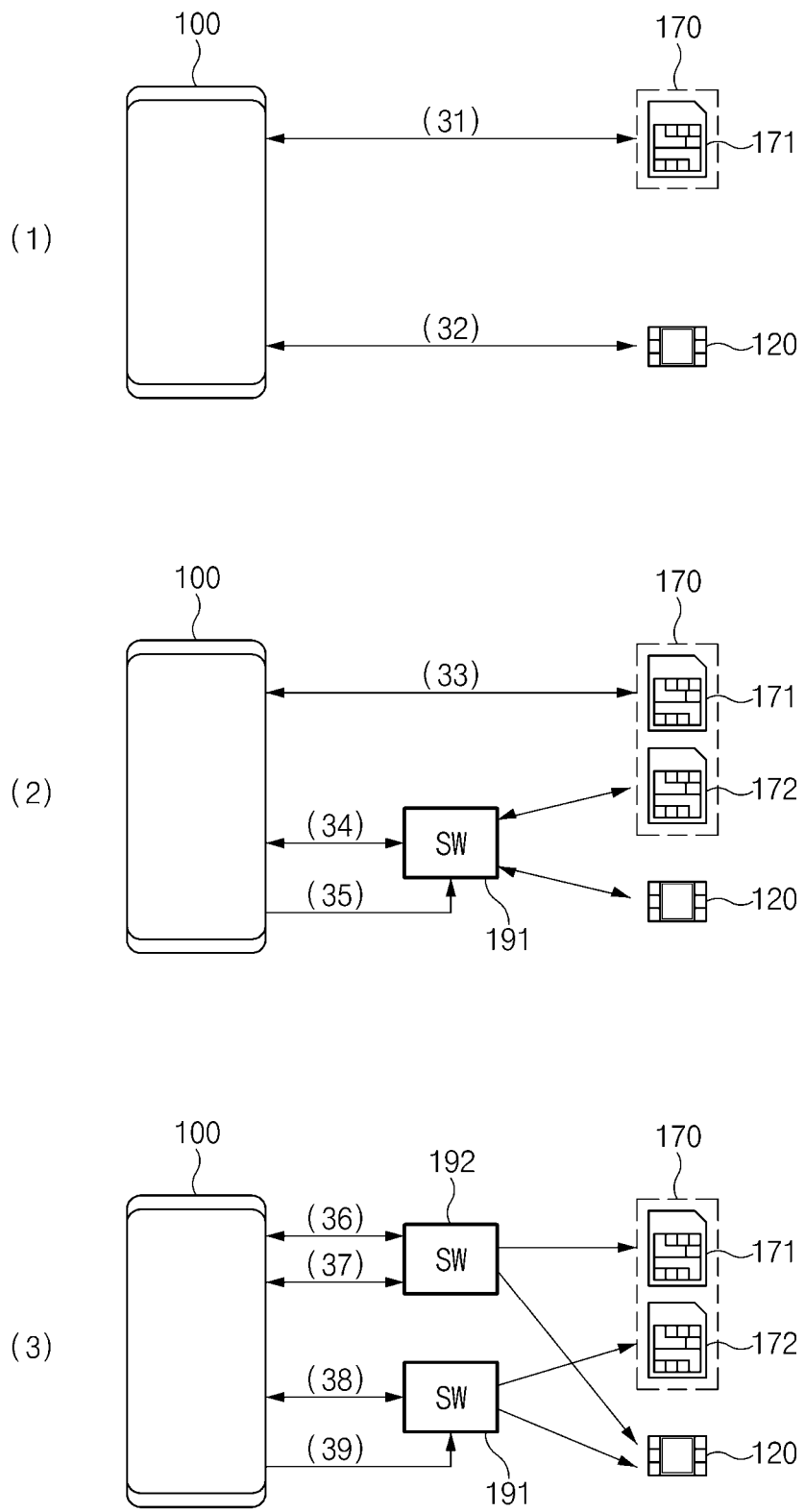
FIG. 10 illustrates an electronic device including a plurality of secure modules according to some embodiments of this disclosure.

FIG. 10 illustrates an electronic device including a plurality of secure modules according to certain embodiments of this disclosure.

According to certain embodiments, an electronic device 100 (e.g., an electronic device 100 of FIG. 1A) may include a plurality of secure modules.

Referring to non-limiting example (1) of FIG. 10, the electronic device 100 may include a secure module 120 according to various embodiments and a legacy secure module 171 and may independently control the secure module 120 and the legacy secure module 171.

To this end, the electronic device 100 may include a first interface 31 (e.g., an interface 18 of FIG. 8) for connecting at least one processor with the legacy secure module 171 and may include a second interface 32 (e.g., an interface 18 of FIG. 8) for connecting at least one processor with the secure module 120 according to some embodiments.

Referring to non-limiting example (2) of FIG. 10, the electronic device 100 may include a plurality of legacy secure modules 171 and 172 and the secure module 120 according to certain embodiments. The electronic device 100 may include, for example, the first legacy secure module 171, the second legacy secure module 172, and the secure module 120.

According to various embodiments, the electronic device 100 may be selectively connected to one (e.g., the second legacy secure module 172) of the plurality of legacy secure modules 171 and 172 and the secure module 120. To this end, the electronic device 100 may include a switch 191. For example, a second interface 34 (e.g., the second interface 32 of (1) of FIG. 10) may be arranged among the second legacy secure module 172, the secure module 120, and the electronic device 100. The switch 191 may be disposed to selectively connect the second interface 34 to each module. According to some embodiments, a control interface 35 may be connected to the switch 191 such that the electronic device 100 controls the switch 191.

In addition, the electronic device 100 may include a first interface 33 (e.g., the first interface 31 of (1) of FIG. 10) for connecting at least one processor with the first legacy secure module 171. The first interface 33 may be an interface the legacy secure module 171 may use for itself.

Referring to non-limiting example (3) of FIG. 10, the electronic device 100 may include the plurality of legacy secure modules 171 and 172 and may be selectively connected with the plurality of legacy secure modules 171 and 172 among the plurality of legacy secure modules 171 and 172 and the secure module 120.

For example, the electronic device 100 may select any one of the first legacy secure module 171 among the plurality of legacy secure modules 171 and 172 or the secure module 120 and may select any one of the second legacy secure module 172 among the plurality of legacy secure modules 171 and 172 or the secure module 120. To this end, the electronic device 100 may include a first switch 191 and a second switch 192. Each of the first switch 191 and the second switch 192 may be the same or similar to the switch 191 of (2) of FIG. 10.

The second switch 192 may selectively connect the electronic device 100 with any one of the secure module 120 and the first legacy secure module 171. The first switch 191 may selectively connect the electronic device 100 with any one of the secure module 120 and the second legacy secure module 172.

According to certain embodiments, the first switch 191 may be connected with at least one processor of the electronic device 100 through a second interface 38 (e.g., the second interface 32 of (1) of FIG. 10) and may be connected with the second interface 38 which supports a communication protocol when the secure module 120 or the second legacy secure module 172 is selected by a second control interface 39 (e.g., the control interface 35 of (2) of FIG. 10). The first switch 191 may be controlled by at least one processor through the second control interface 39 such that the second interface 38 is selectively connected to the second legacy secure module 172 or the secure module 120.

According to various embodiments, the second switch 192 may be connected with at least one processor of the electronic device 100 through the first interface 36 (e.g., the first interface 31 of (1) of FIG. 10) and may selectively connect the secure module 120 or the first legacy secure module 171 with the first interface 36. The at least one processor of the electronic device 100 may control an operation of the second switch 192 through a first control interface 37.

According to some embodiments, the secure module 120 may be physically one chip. As shown in FIG. 3A, the secure module 120 may include a plurality of eSIM domains. Alternatively, as shown in FIG. 4, the secure module 120 may include a plurality of APSDs, each of which supports an eSIM. Each of the plurality of eSIM domains or the plurality of APSDs may provide information in response to at least one interface. For example, each of the plurality of eSIM domains may be connected to at least one of the first interface 31 and the second interface 32, and the plurality of eSIM domains may simultaneously or sequentially provide information through the interface.

According to certain embodiments, as a plurality of eSIMs are implemented in the secure module 120 which is physically one chipset, the one secure module 120 may support a multi-standby mode or a multi-active mode. For example, the multi-standby mode may be a dual SIM dual standby, and the multi-active mode may be a dual SIM dual active. For example, the multi-standby mode may mean that a communication circuit 140 connected to one CP is connected in multiple manners, and the multi-active mode may mean that the communication circuit 140 includes multiple CPs, each of which is connected to the communication circuit 140.

According to various embodiments, the secure module 120 may support two or more protocols. In the description of FIG. 10, the legacy secure modules 171 and 172 are described, but the legacy secure modules 171 and 172 may be the secure module 120 according to various embodiments disclosed in the present disclosure.

According to some embodiments, the first interface 31, 33, or 36 or the second interface 32, 34, or 38 may be an interface which supports an eSIM or a SIM, for example, an ISO interface.

According to certain embodiments, the second interface 32, 34, or 38 or the control interface 35, a first control interface 37, and/or a second control interface 39 may be a control interface which transmits and receives a control signal. For example, the second interface 32 and/or the second interface 34 may be a GPIO, an I2C, an SPI, or the like.

According to certain embodiments, an electronic device (e.g., an electronic device 100 of FIG. 1A) may include a first processor (e.g., a first processor 111 of FIG. 1A) configured to perform communication with an external electronic device, a second processor (e.g., a second processor 12 of FIG. 1A) configured to execute at least one application, and a secure module (e.g., a secure module 120 of FIG. 1A) configured to include a first interface (e.g., a first interface 11 of FIG. 1A) electrically connected with the first processor, a second interface (e.g., a second interface 11b of FIG. 1A) electrically connected with the second processor, a memory (e.g., a memory 128 of FIG. 1) for storing subscriber information and biometric information, and a control circuit (e.g., a control circuit 122 of FIG. 1A). The control circuit may be configured to provide the subscriber information to the first processor through the first interface, based at least on a request received in connection with the communication from the first processor and provide the biometric information to the second processor through the second interface, based at least on a request received in connection with at least a portion of the at least one application from the second processor.

According to various embodiments, the memory may include a first area for storing the subscriber information and a second area for storing the biometric information.

According to an embodiment, the secure module may be configured to store profile information for providing communication with the external electronic device in the first area.

According to certain embodiments, the secure module may include a third area where a first channel between the first area and the first processor and a second channel between the second area and the second processor are established.

According to various embodiments, the memory may include a first memory for storing the subscriber information and a second memory, independent of the first memory, for storing the biometric information.

According to an embodiment, the first interface may include an international organization for standardization (ISO) interface.

According to certain embodiments, the second interface may include a serial peripheral interface (SPI).

According to various embodiments, the electronic device may further include a near field communication (NFC) module (e.g., an NFC module 160 of FIG. 2). The control circuit may be configured to provide the biometric information to the second processor using the NFC module.

According to an embodiment, the electronic device may be configured to provide state information associated with the secure module and may further include a third interface (e.g., a third interface 13 of FIG. 7A) electrically connected to at least one of the first processor and the second processor.

According to certain embodiments, the electronic device may further include a radio interface layer (RIL) (e.g., fifth interface 15 of FIG. 7B, which, as noted herein, can be a RIL interface) configured to electrically connect the first processor with the second processor.

According to various embodiments, the third interface (e.g., a third interface 13 or a fourth interface 14 of FIG. 7A) may include a general purpose input output (GPIO) pin.

According to an embodiment, an electronic device (e.g., an electronic device 100 or a secure module 120 of FIG. 1A) may include a first interface (e.g., a first interface 11a of FIG. 1A) electrically connected with a first processor (e.g., a first processor 10 of FIG. 1A), a second interface (e.g., a second interface 11b of FIG. 1A) electrically connected with a second processor (e.g., a second processor 12 of FIG. 1A), a memory (e.g., a memory 128 of FIG. 1) for storing subscriber information and biometric information, and a control circuit (e.g., a control circuit 122 of FIG. 1A). The control circuit may be configured to provide the subscriber information to the first processor through the first interface, based at least on a request of the first processor and provide the biometric information to the second processor through the second interface, based at least on a request of the second processor.

According to certain embodiments, the memory may include a first area for storing the subscriber information and a second area for storing the biometric information.

According to various embodiments, the secure module may include a third area for delivering any one of the biometric information and the subscriber information to the first processor or the second processor during the same time interval.

According to an embodiment, the memory may include a first memory for storing the subscriber information and a second memory, independent of the first memory, for storing the biometric information.

According to certain embodiments, the first interface and the second interface may conform to different protocols.

According to various embodiments, the first interface and the second interface may be arranged in one chip.

According to an embodiment, the first interface may include an international organization for standardization (ISO) interface.

According to certain embodiments, the second interface may include a serial peripheral interface (SPI).

According to various embodiments, an electronic device (e.g., an electronic device 100 of FIG. 1A) may include a secure module (e.g., a secure module 120 of FIG. 1A) configured to include a first interface (e.g., a first interface 11a of FIG. 1A), a second interface (e.g., a second interface 11b of FIG. 1A), and a memory (e.g., a memory 128 of FIG. 1) for storing subscriber information and biometric information, a first processor (e.g., a first processor 10 of FIG. 1A) configured to be electrically connected with the secure module through the first interface and perform communication with an external electronic device, and a second processor (e.g., a second processor 12 of FIG. 1A) configured to be electrically connected with the secure module through the second interface and execute at least one application. The first processor may be configured to obtain a request associated with initialization of the secure module and refrain from performing the initialization while the first processor uses the secure module, in response to the request, and perform the initialization while the first processor does not use the secure module.

FIG. 11 illustrates, in block diagram format, an electronic device 1101 in a network environment 1100 according to various embodiments. Referring to the non-limiting example of FIG. 11, the electronic device 1101 in the network environment 1100 may communicate with an electronic device 1102 via a first network 1198 (e.g., a short-range wireless communication network), or an electronic device 1104 or a server 1108 via a second network 1199 (e.g., a long-range wireless communication network). According to an embodiment, the electronic device 1101 may communicate with the electronic device 1104 via the server 1108. According to certain embodiments, the electronic device 1101 may include a processor 1120, memory 1130, an input device 1150, a sound output device 1155, a display device 1160, an audio module 1170, a sensor module 1176, an interface 1177, a haptic module 1179, a camera module 1180, a power management module 1188, a battery 1189, a communication module 1190, a subscriber identification module (SIM) 1196, or an antenna module 1197. In some embodiments, at least one (e.g., the display device 1160 or the camera module 1180) of the components may be omitted from the electronic device 1101, or one or more other components may be added in the electronic device 1101. In some embodiments, some of the components may be implemented as single integrated circuitry. For example, the sensor module 1176 (e.g., a fingerprint sensor, an iris sensor, or an illuminance sensor) may be implemented as embedded in the display device 1160 (e.g., a display).

The processor 1120 may execute, for example, software (e.g., a program 1140) to control at least one other component (e.g., a hardware or software component) of the electronic device 1101 coupled with the processor 1120, and may perform various data processing or computation. According to at least one embodiment, as at least part of the data processing or computation, the processor 1120 may load a command or data received from another component (e.g., the sensor module 1176 or the communication module 1190) in volatile memory 1132, process the command or the data stored in the volatile memory 1132, and store resulting data in non-volatile memory 1134. According to various embodiments, the processor 1120 may include a main processor 1121 (e.g., a central processing unit (CPU) or an application processor (AP)), and an auxiliary processor 1123 (e.g., a graphics processing unit (GPU), an image signal processor (ISP), a sensor hub processor, or a communication processor (CP)) that is operable independently from, or in conjunction with, the main processor 1121. Additionally or alternatively, the auxiliary processor 1123 may be adapted to consume less power than the main processor 1121, or to be specific to a specified function. The auxiliary processor 1123 may be implemented as separate from, or as part of the main processor 1121.

The auxiliary processor 1123 may control at least some of functions or states related to at least one component (e.g., the display device 1160, the sensor module 1176, or the communication module 1190) among the components of the electronic device 1101, instead of the main processor 1121 while the main processor 1121 is in an inactive (e.g., sleep) state, or together with the main processor 1121 while the main processor 1121 is in an active state (e.g., executing an application). According to an embodiment, the auxiliary processor 1123 (e.g., an image signal processor or a communication processor) may be implemented as part of another component (e.g., the camera module 1180 or the communication module 1190) functionally related to the auxiliary processor 1123.

The memory 1130 may store various data used by at least one component (e.g., the processor 1120 or the sensor module 1176) of the electronic device 1101. The various data may include, for example, software (e.g., the program 1140) and input data or output data for a command related thereto. The memory 1130 may include the volatile memory 1132 or the non-volatile memory 1134.

The program 1140 may be stored in the memory 1130 as software, and may include, for example, an operating system (OS) 1142, middleware 1144, or an application 1146.

The input device 1150 may receive a command or data to be used by other component (e.g., the processor 1120) of the electronic device 1101, from the outside (e.g., a user) of the electronic device 1101. The input device 1150 may include, for example, a microphone, a mouse, a keyboard, or a digital pen (e.g., a stylus pen).

The sound output device 1155 may output sound signals to the outside of the electronic device 1101. The sound output device 1155 may include, for example, a speaker or a receiver. The speaker may be used for general purposes, such as playing multimedia or playing record, and the receiver may be used for an incoming calls. According to certain embodiments, the receiver may be implemented as separate from, or as part of the speaker.

The display device 1160 may visually provide information to the outside (e.g., a user) of the electronic device 1101. The display device 1160 may include, for example, a display, a hologram device, or a projector and control circuitry to control a corresponding one of the display, hologram device, and projector. According to various embodiments, the display device 1160 may include touch circuitry adapted to detect a touch, or sensor circuitry (e.g., a pressure sensor) adapted to measure the intensity of force incurred by the touch.

The audio module 1170 may convert a sound into an electrical signal and vice versa. According to an embodiment, the audio module 1170 may obtain the sound via the input device 1150, or output the sound via the sound output device 1155 or a headphone of an external electronic device (e.g., an electronic device 1102) directly (e.g., through a wired connection) or wirelessly coupled with the electronic device 1101.

The sensor module 1176 may detect an operational state (e.g., power or temperature) of the electronic device 1101 or an environmental state (e.g., a state of a user) external to the electronic device 1101, and then generate an electrical signal or data value corresponding to the detected state. According to certain embodiments, the sensor module 1176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1177 may support one or more specified protocols to be used for the electronic device 1101 to be coupled with the external electronic device (e.g., the electronic device 1102) directly (e.g., through a wired connection) or wirelessly. According to certain embodiments, the interface 1177 may include, for example, a high definition multimedia interface (HDMI), a universal serial bus (USB) interface, a secure digital (SD) card interface, or an audio interface.

A connecting terminal 1178 may include a connector via which the electronic device 1101 may be physically connected with the external electronic device (e.g., the electronic device 1102). According to various embodiments, the connecting terminal 1178 may include, for example, a HDMI connector, a USB connector, a SD card connector, or an audio connector (e.g., a headphone connector).

The haptic module 1179 may convert an electrical signal into a mechanical stimulus (e.g., a vibration or a movement) or electrical stimulus which may be recognized by a user via his tactile sensation or kinesthetic sensation. According to an embodiment, the haptic module 1179 may include, for example, a motor, a piezoelectric element, or an electric stimulator.

The camera module 1180 may capture a still image or moving images. According to certain embodiments, the camera module 1180 may include one or more lenses, image sensors, image signal processors, or flashes.

The power management module 1188 may manage power supplied to the electronic device 1101. According to one embodiment, the power management module 1188 may be implemented as at least part of, for example, a power management integrated circuit (PMIC).

The battery 1189 may supply power to at least one component of the electronic device 1101. According to various embodiments, the battery 1189 may include, for example, a primary cell which is not rechargeable, a secondary cell which is rechargeable, or a fuel cell.

The communication module 1190 may support establishing a direct (e.g., wired) communication channel or a wireless communication channel between the electronic device 1101 and the external electronic device (e.g., the electronic device 1102, the electronic device 1104, or the server 1108) and performing communication via the established communication channel. The communication module 1190 may include one or more communication processors that are operable independently from the processor 1120 (e.g., the application processor (AP)) and supports a direct (e.g., wired) communication or a wireless communication. According to an embodiment, the communication module 1190 may include a wireless communication module 1192 (e.g., a cellular communication module, a short-range wireless communication module, or a global navigation satellite system (GNSS) communication module) or a wired communication module 1194 (e.g., a local area network (LAN) communication module or a power line communication (PLC) module). A corresponding one of these communication modules may communicate with the external electronic device via the first network 1198 (e.g., a short-range communication network, such as BLUETOOTH™, wireless-fidelity (Wi-Fi) direct, or infrared data association (IrDA)) or the second network 1199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1192 may identify and authenticate the electronic device 1101 in a communication network, such as the first network 1198 or the second network 1199, using subscriber information (e.g., international mobile subscriber identity (IMSI)) stored in the subscriber identification module 1196.

The antenna module 1197 may transmit or receive a signal or power to or from the outside (e.g., the external electronic device) of the electronic device 1101. According to certain embodiments, the antenna module 1197 may include an antenna including a radiating element composed of a conductive material or a conductive pattern formed in or on a substrate (e.g., PCB). According to various embodiments, the antenna module 1197 may include a plurality of antennas. In such a case, at least one antenna appropriate for a communication scheme used in the communication network, such as the first network 1198 or the second network 1199, may be selected, for example, by the communication module 1190 (e.g., the wireless communication module 1192) from the plurality of antennas. The signal or the power may then be transmitted or received between the communication module 1190 and the external electronic device via the selected at least one antenna. According to an embodiment, another component (e.g., a radio frequency integrated circuit (RFIC)) other than the radiating element may be additionally formed as part of the antenna module 1197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to certain embodiments, commands or data may be transmitted or received between the electronic device 1101 and the external electronic device 1104 via the server 1108 coupled with the second network 1199. Each of the electronic devices 1102 and 1104 may be a device of a same type as, or a different type, from the electronic device 1101. According to various embodiments, all or some of operations to be executed at the electronic device 1101 may be executed at one or more of the external electronic devices 1102, 1104, or 1108. For example, if the electronic device 1101 should perform a function or a service automatically, or in response to a request from a user or another device, the electronic device 1101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1101. The electronic device 1101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., through a wired connection), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to certain embodiments, the module may be implemented in a form of an application-specific integrated circuit (ASIC).

Various embodiments as set forth herein may be implemented as software (e.g., the program 1140) including one or more instructions that are stored in a storage medium (e.g., internal memory 1136 or external memory 1138) that is readable by a machine (e.g., the electronic device 1101). For example, a processor (e.g., the processor 1120) of the machine (e.g., the electronic device 1101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to various embodiments, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAYSTORE™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

Although the present disclosure has been described with various embodiments, various changes and modifications may be suggested to one skilled in the art. It is intended that the present disclosure encompass such changes and modifications as fall within the scope of the appended claims.

According to various embodiments of the present disclosure, the electronic device may efficiently manage a space where a secure module is mounted in the electronic device.

In addition, various effects directly or indirectly ascertained through the present disclosure may be provided.

Other aspects, advantages, and salient features of the disclosure will become apparent to those skilled in the art from the following detailed description, which, taken in conjunction with the annexed drawings, discloses various embodiments of the present disclosure.

What is claimed is:

1. An electronic device, comprising:
a memory device storing instructions;
a first processor capable of executing the instructions and configured to perform communication with an external electronic device;
a second processor capable of executing the instructions and configured to execute at least one application; and
a secure module configured as circuitry and including a first interface electrically connected with the first processor, a second interface electrically connected with the second processor, a memory storing subscriber information and biometric information, and a control circuit,
wherein the control circuit is configured to:
provide the subscriber information to the first processor through the first interface, based at least on a request received in connection with the communication from the first processor, and
provide the biometric information to the second processor through the second interface, based at least on a request received in connection with at least a portion of the at least one application from the second processor.

2. The electronic device of claim 1, wherein the memory comprises:
a first area for storing the subscriber information; and
a second area for storing the biometric information.

3. The electronic device of claim 2, wherein the secure module is configured to store profile information for communicating with the external electronic device in the first area.

4. The electronic device of claim 1, wherein the secure module comprises:
a third area where a first channel between a first area and the first processor and a second channel between a second area and the second processor are established.

5. The electronic device of claim 1, wherein the memory comprises:
a first memory for storing the subscriber information; and
a second memory, independent of the first memory for storing the biometric information.

6. The electronic device of claim 1, wherein the first interface comprises an international organization for standardization (ISO) interface.

7. The electronic device of claim 1, wherein the second interface comprises a serial peripheral interface (SPI).

8. The electronic device of claim 1, further comprising:
a near field communication (NFC) module,
wherein the control circuit is configured to provide the biometric information to the second processor using the NFC module.

9. The electronic device of claim 1, wherein the electronic device is configured to:
provide state information associated with the secure module, and
further comprising:
a third interface electrically connected to at least one of the first processor and the second processor.

10. The electronic device of claim 9, wherein the first processor is electrically connected with the second processor via a radio interface layer (RIL).

11. The electronic device of claim 10, wherein the third interface comprises a general purpose input output (GPIO) pin.

12. A secure module, comprising:
a first interface electrically connected with a first processor;
a second interface electrically connected with a second processor;
a memory storing subscriber information and biometric information; and
a control circuit,
wherein the control circuit is configured to:
provide the subscriber information to the first processor through the first interface, based at least on a request of the first processor, and
provide the biometric information to the second processor through the second interface, based at least on a request of the second processor.

13. The secure module of claim 12, wherein the memory comprises:
a first area for storing the subscriber information; and
a second area for storing the biometric information.

14. The secure module of claim 13, further comprising:
a third area for providing one or more of the biometric information and the subscriber information to the first processor or the second processor during a same time interval.

15. The secure module of claim 12, wherein the memory comprises:
a first memory for storing the subscriber information; and
a second memory, independent of the first memory, for storing the biometric information.

16. The secure module of claim 12, wherein the first interface and the second interface conform to different protocols.

17. The secure module of claim 12, wherein the first interface and the second interface are arranged in one chip.

18. The secure module of claim 12, wherein the first interface comprises an International Organization for Standardization (ISO) interface.

19. The secure module of claim 18, wherein the second interface comprises a serial peripheral interface (SPI).

20. An electronic device, comprising:
a memory device storing instructions;
a secure module configured to include a first interface, a second interface, and a memory storing subscriber information and biometric information;
a first processor capable of executing the instructions and configured to be electrically connected with the secure module through the first interface and perform communication with an external electronic device and receive, from the secure module, the subscriber information through the first interface; and
a second processor capable of executing the instructions and configured to be electrically connected with the secure module through the second interface and execute at least one application and receive, from the secure module, the biometric information through the second interface,
wherein the first processor is configured to:
obtain a request associated with initialization of the secure module; and
refrain from performing initialization while the first processor uses the secure module, in response to the request, and perform initialization while the first processor does not use the secure module.

* * * * *